(12) United States Patent
Udagawa et al.

(10) Patent No.: US 9,043,177 B2
(45) Date of Patent: May 26, 2015

(54) POSTURE INFORMATION CALCULATION DEVICE, POSTURE INFORMATION CALCULATION SYSTEM, POSTURE INFORMATION CALCULATION METHOD, AND INFORMATION STORAGE MEDIUM

(75) Inventors: Hirofumi Udagawa, Ina (JP); Yoshihiro Kobayashi, Komagane (JP); Yasushi Nakaoka, Shiojiri (JP)

(73) Assignee: Seiko Epson Corporation (JP)

( * ) Notice: Subject to any disclaimer, the term of this patent is extended or adjusted under 35 U.S.C. 154(b) by 347 days.

(21) Appl. No.: 13/020,876

(22) Filed: Feb. 4, 2011

(65) Prior Publication Data

US 2011/0218753 A1 Sep. 8, 2011

(30) Foreign Application Priority Data

Mar. 5, 2010 (JP) .................................. 2010-49493

(51) Int. Cl.
*G01C 21/10* (2006.01)
*G01P 15/00* (2006.01)
*G01P 7/00* (2006.01)
*G01C 9/00* (2006.01)
*G06F 15/00* (2006.01)
*G06F 19/00* (2011.01)

(52) U.S. Cl.
CPC ................ *G06F 15/00* (2013.01); *G06F 19/00* (2013.01)

(58) Field of Classification Search
USPC .................................... 702/94, 141, 142, 150
See application file for complete search history.

(56) References Cited

U.S. PATENT DOCUMENTS

| 6,176,837 | B1* | 1/2001 | Foxlin ........................... 600/595 |
| 7,636,645 | B1 | 12/2009 | Yen et al. |
| 7,702,608 | B1 | 4/2010 | Bererton et al. |
| 7,899,772 | B1 | 3/2011 | Bererton et al. |
| 8,051,024 | B1 | 11/2011 | Bererton et al. |
| 8,112,371 | B1 | 2/2012 | Tu et al. |
| 8,156,067 | B1 | 4/2012 | Tu et al. |
| 8,195,585 | B1 | 6/2012 | Tu et al. |
| 8,251,821 | B1 | 8/2012 | Yen et al. |
| 8,384,665 | B1 | 2/2013 | Powers, III et al. |
| 2008/0184770 | A1* | 8/2008 | Sato ............................... 73/1.37 |
| 2008/0318677 | A1 | 12/2008 | Ohta |

(Continued)

FOREIGN PATENT DOCUMENTS

| JP | 09-005104 | 1/1997 |
| JP | 2007-183138 | 7/2007 |

(Continued)

*Primary Examiner* — Michael Nghiem
*Assistant Examiner* — Ivan Rabovianski
(74) *Attorney, Agent, or Firm* — Harness, Dickey & Pierce, P.L.C.

(57) ABSTRACT

A sensor information acquisition section acquires angular velocity information (GX, GY, GZ) around three axes acquired by three angular velocity sensors, and acceleration information (AX, AY, AZ) in three axial directions acquired by three acceleration sensors. A posture information calculation section calculates a posture angle and position coordinates in a virtual three-dimensional space based on the angular velocity information (GX, GY, GZ) and the acceleration information (AX, AY, AZ). The posture information calculation section calculates a fixed coordinate system velocity vector based on an inertial coordinate system acceleration vector (A) obtained from the acceleration information (AX, AY, AZ), and calculates position coordinates in a virtual three-dimensional space corresponding to the fixed coordinate system velocity vector.

19 Claims, 10 Drawing Sheets

(56) References Cited

U.S. PATENT DOCUMENTS

| | | |
|---|---|---|
| 2009/0221368 A1 | 9/2009 | Yen et al. |
| 2009/0221374 A1 | 9/2009 | Yen et al. |
| 2009/0326846 A1 | 12/2009 | Ohta |
| 2010/0009761 A1 | 1/2010 | Ohta |
| 2010/0113153 A1 | 5/2010 | Yen et al. |
| 2011/0043443 A1 | 2/2011 | Kawano et al. |
| 2011/0044501 A1 | 2/2011 | Tu et al. |
| 2011/0109548 A1 | 5/2011 | Tu et al. |
| 2011/0112996 A1 | 5/2011 | Tu et al. |
| 2012/0169887 A1 | 7/2012 | Zhu et al. |
| 2012/0208639 A1 | 8/2012 | Reynolds et al. |
| 2012/0256835 A1 | 10/2012 | Musick, Jr. et al. |

FOREIGN PATENT DOCUMENTS

| | | |
|---|---|---|
| JP | 2008-307392 A | 12/2008 |
| JP | 2009-003651 A | 1/2009 |
| JP | 2010-048814 A | 3/2010 |

* cited by examiner

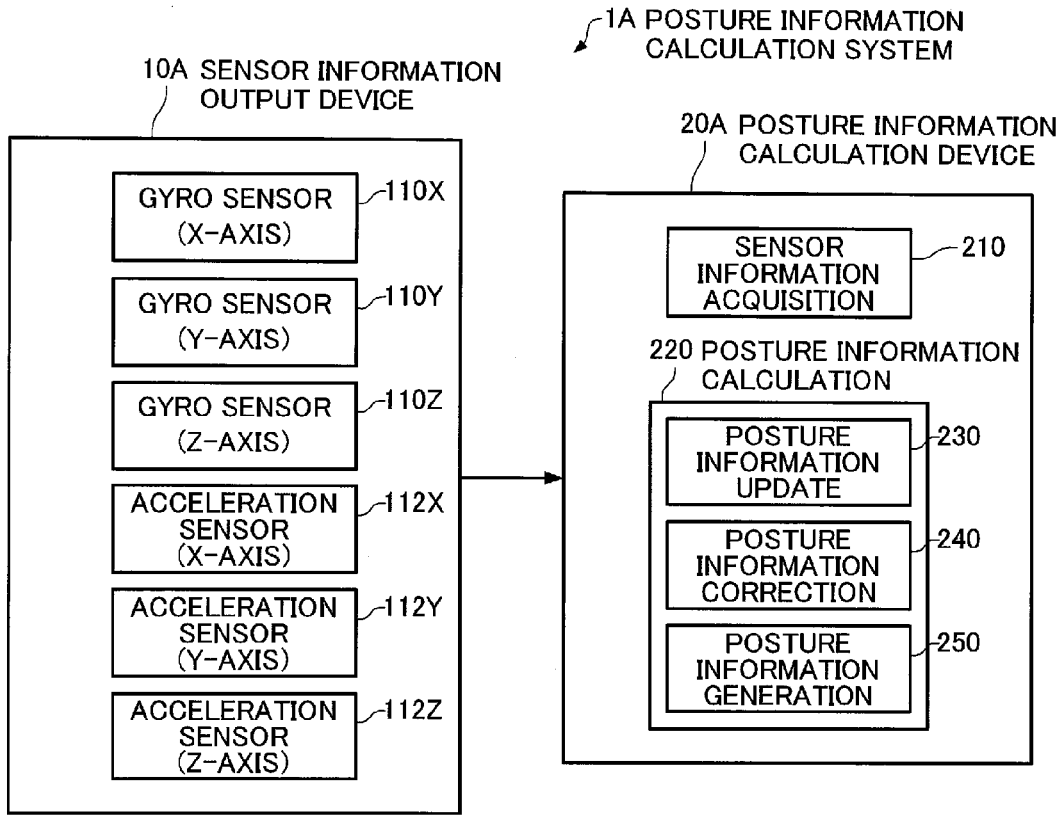
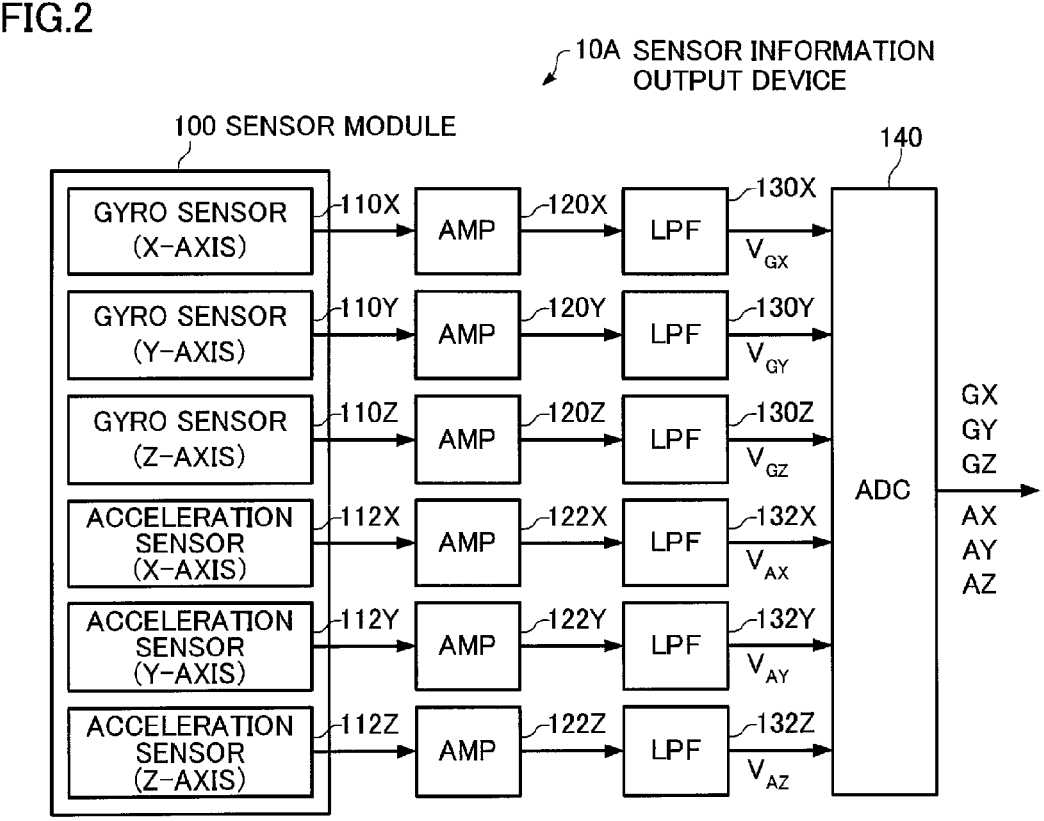

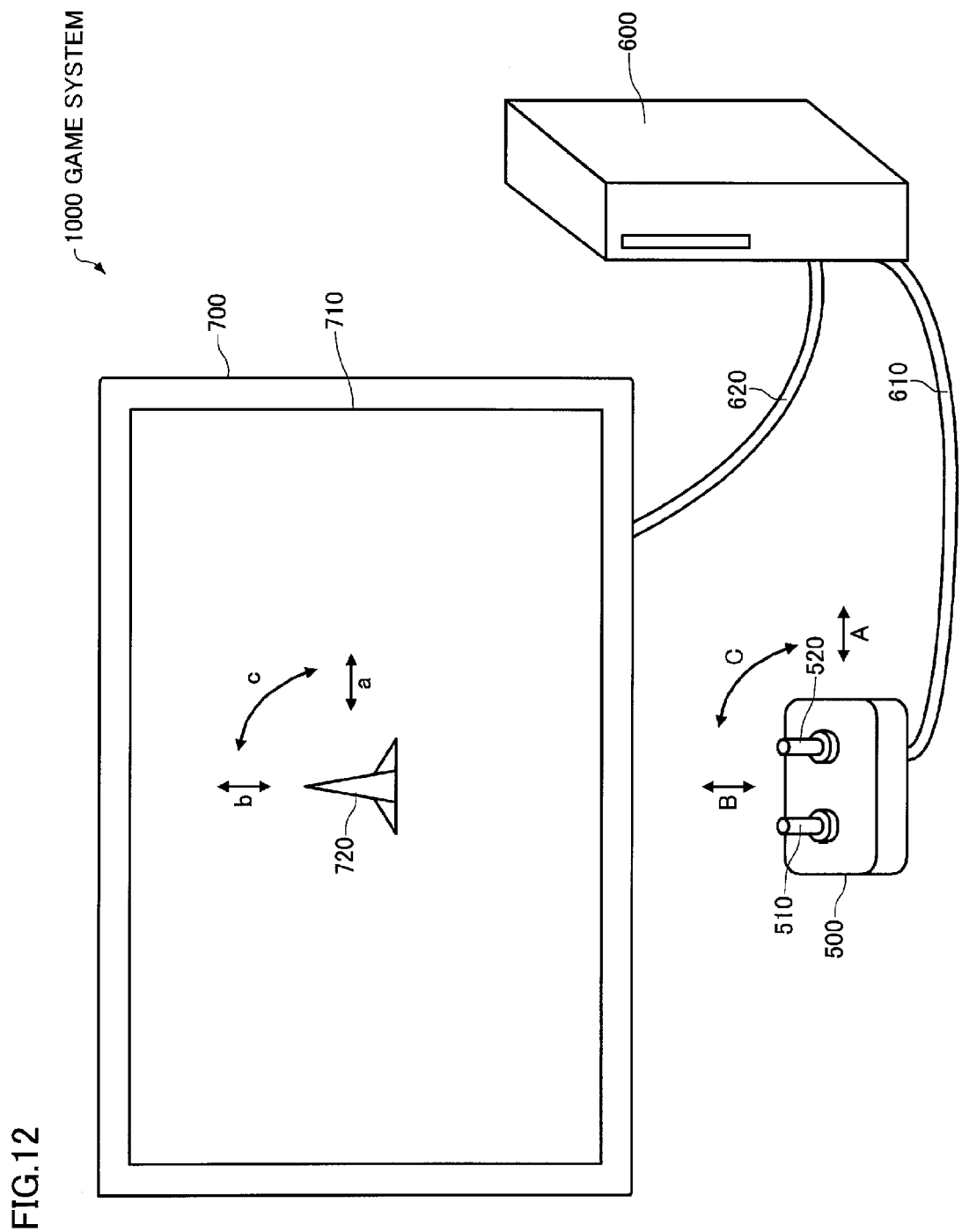

POSTURE INFORMATION CALCULATION DEVICE, POSTURE INFORMATION CALCULATION SYSTEM, POSTURE INFORMATION CALCULATION METHOD, AND INFORMATION STORAGE MEDIUM

Japanese Patent Application No. 2010-49493 filed on Mar. 5, 2010 is hereby incorporated by reference in its entirety.

BACKGROUND OF THE INVENTION

The present invention relates to a posture information calculation device, a posture information calculation system, a posture information calculation method, and an information storage medium.

A system that calculates the posture of an object using an inertial sensor has been utilized for various applications. For example, a system that stably controls the posture of a moving object (e.g., automobile or helicopter) has been implemented by providing triaxial angular velocity sensors and triaxial acceleration sensors in the moving object, and calculating the posture of the moving object based on information obtained from the sensors.

The posture of an object can be normally specified by the posture angle and the position of the object. The posture angle of the object is obtained by performing a first-order integration process on the angular velocity vector detected by the triaxial angular velocity sensors. However, a small offset is included in the value output from the triaxial angular velocity sensors, and gradually accumulated by performing a first-order integration process on the angular velocity vector. Therefore, an error of the true posture angle with respect to the calculated posture angle gradually increases in proportion to the offset, so that a result is obtained whereby the object rotates by a small angular velocity even if the object is stationary. In order to solve the above problem, JP-A-9-5104 and JP-A-2007-183138 disclose a method that estimates the true value of the posture angle from the sensor output value using a Kalman filter.

The position of the object is obtained by performing a second-order integration process on the acceleration vector detected by the triaxial acceleration sensors. A small offset is also included in the value output from the triaxial acceleration sensors, and gradually accumulated, so that a result is obtained whereby the object moves even if the object is stationary. Moreover, since a second-order integration process is performed on the acceleration vector, the error increase rate of the calculated position with respect to the true position is proportional to the second power of the offset (i.e., higher than the error increase rate of the posture angle). Therefore, it is necessary to increase the Kalman gain in order to estimate the true value of the position using the Kalman filter. However, when the Kalman gain is increased to a large extent, a calculation result is obtained whereby the object is stationary even if the object moves slowly, since the calculated position of the object is too rapidly returned to the true position. In particular, it is necessary to increase the Kalman gain as the offset of the sensor relatively increases. Therefore, it is very difficult to estimate the position of an object using the Kalman filter merely based on the output value of the acceleration sensor.

In order to solve the above problem, the position of the object has been estimated from the output value of the acceleration sensor and given information obtained from the outside. For example, information about the relative positional relationship between an object and an infrared emitting device can be obtained by providing the infrared emitting device at a predetermined position, and imaging the infrared emitting device using a CCD camera secured on the object. In this case, the true value of the position of the object can be estimated using the Kalman filter based on the resulting information. However, since this method requires an apparatus other than the sensor, the size of the system increases.

For example, when operating a virtual 3D model using a pointing device, the strict position of the virtual 3D model need not be necessarily calculated insofar as the position of the virtual 3D model does not diverge with time, and the virtual 3D model moves to follow the movement of the pointing device. Since a reduction in cost is required for such a system, it is not desirable to increase the system size (scale).

SUMMARY

According to a first aspect of the invention, there is provided a posture information calculation device that calculates a posture angle and position coordinates in a virtual three-dimensional space based on three-axis angular velocity information detected by three angular velocity sensors, and three-axis acceleration information detected by three acceleration sensors, the three-axis angular velocity information being information about angular velocities around three axes that are not parallel to one another, and the three-axis acceleration information being information about accelerations in three axial directions that are not parallel to one another, the posture information calculation device comprising:

a sensor information acquisition section that acquires the three-axis angular velocity information, and the three-axis acceleration information; and a posture information calculation section that calculates the posture angle and the position coordinates in the virtual three-dimensional space based on the three-axis angular velocity information and the three-axis acceleration information acquired by the sensor information acquisition section, the posture information calculation section calculating a fixed coordinate system velocity vector based on an inertial coordinate system acceleration vector obtained from the three-axis acceleration information, and calculating the position coordinates in the virtual three-dimensional space corresponding to the fixed coordinate system velocity vector.

According to a second aspect of the invention, there is provided a posture information calculation system including:

three angular velocity sensors that respectively detect three-axis angular velocity information that is information about angular velocities around three axes that are not parallel to one another;

three acceleration sensors that respectively detect three-axis acceleration information that is information about accelerations in three axial directions that are not parallel to one another; and the above posture information calculation device.

According to a third aspect of the invention, there is provided a posture information calculation method that calculates a posture angle and position coordinates in a virtual three-dimensional space based on three-axis angular velocity information detected by three angular velocity sensors, and three-axis acceleration information detected by three acceleration sensors, the three-axis angular velocity information being information about angular velocities around three axes that are not parallel to one another, and the three-axis acceleration information being information about accelerations in three axial directions that are not parallel to one another, the posture information calculation method comprising:

a sensor information acquisition step that acquires the three-axis angular velocity information, and the three-axis acceleration information; and a posture information calculation step that calculates the posture angle and the position coordinates in the virtual three-dimensional space based on the three-axis angular velocity information and the three-axis acceleration information acquired by the sensor information acquisition step, the posture information calculation step calculating a fixed coordinate system velocity vector based on an inertial coordinate system acceleration vector obtained from the three-axis acceleration information, and calculating the position coordinates in the virtual three-dimensional space corresponding to the fixed coordinate system velocity vector.

According to a fourth aspect of the invention, there is provided a computer-readable information storage medium storing a program that calculates a posture angle and position coordinates in a virtual three-dimensional space based on three-axis angular velocity information detected by three angular sensors, and three-axis acceleration information detected by three acceleration sensors, the three-axis angular velocity information being information about angular velocities around three axes that are not parallel to one another, and the three-axis acceleration information being information about accelerations in three axial directions that are not parallel to one another, the program causing a computer to function as:

a posture information calculation section that calculates the posture angle and the position coordinates in the virtual three-dimensional space based on the three-axis angular velocity information and the three-axis acceleration information, the posture information calculation section calculating a fixed coordinate system velocity vector based on an inertial coordinate system acceleration vector obtained from the three-axis acceleration information, and calculating the position coordinates in the virtual three-dimensional space corresponding to the fixed coordinate system velocity vector.

BRIEF DESCRIPTION OF THE SEVERAL VIEWS OF THE DRAWING

FIG. 1 is a schematic configuration diagram illustrating a posture information calculation system according to a first embodiment of the invention.

FIG. 2 is a diagram illustrating a configuration example of a sensor information output device.

FIG. 12 is a diagram illustrating an example of a game system to which a posture information calculation system is applied.

DETAILED DESCRIPTION OF THE EMBODIMENT

Figure 3:
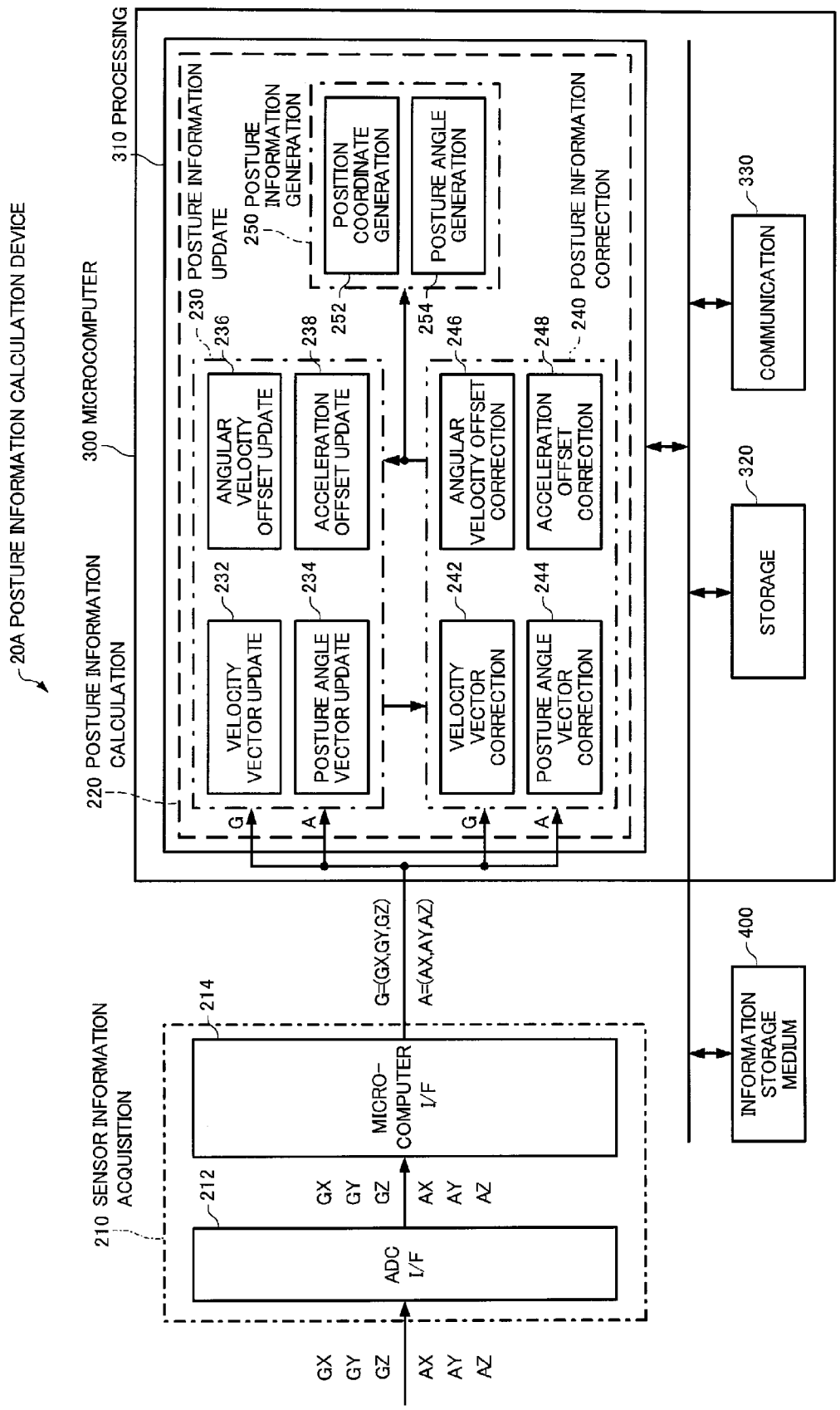
FIG. 3 is a diagram illustrating a configuration example of a posture information calculation device.

The invention may provide a posture information calculation device, a posture information calculation system, a posture information calculation method, and an information storage medium that can appropriately calculate a posture in a virtual three-dimensional space by controlling divergence in position while employing a simple configuration.

(1) One embodiment of the invention relates to a posture information calculation device that calculates a posture angle and position coordinates in a virtual three-dimensional space based on three-axis angular velocity information detected by three angular velocity sensors, and three-axis acceleration information detected by three acceleration sensors, the three-axis angular velocity information being information about angular velocities around three axes that are not parallel to one another, and the three-axis acceleration information being information about accelerations in three axial directions that are not parallel to one another, the posture information calculation device comprising:

a sensor information acquisition section that acquires the three-axis angular velocity information, and the three-axis acceleration information; and a posture information calculation section that calculates the posture angle and the position coordinates in the virtual three-dimensional space based on the three-axis angular velocity information and the three-axis acceleration information acquired by the sensor information acquisition section, the posture information calculation section calculating a fixed coordinate system velocity vector based on an inertial coordinate system acceleration vector obtained from the three-axis acceleration information, and calculating the position coordinates in the virtual three-dimensional space corresponding to the fixed coordinate system velocity vector.

According to the above posture information calculation device, the acceleration vector in the inertial coordinate system (sensor coordinate system) is converted into the velocity vector in the fixed coordinate system. A second-order integration process is necessary for calculating the position (distance) in the fixed coordinate system from the acceleration vector in the inertial coordinate system. However, it suffices to perform a first-order integration process when calculating the velocity vector in the fixed coordinate system from the acceleration vector in the inertial coordinate system. The above posture information calculation device is characterized in that the position coordinates in the virtual three-dimensional space are calculated corresponding to the fixed coordinate system velocity vector. In this case, a drift of the position coordinates (obtained by performing a first-order integration process on the acceleration vector) due to the sensor offset is almost equal to that of the posture angle (obtained by performing a first-order integration process on the angular velocity vector). Therefore, a related-art posture angle calculation method using a Kalman filter can be applied to the above position coordinate calculations. Therefore, a posture information calculation device that can appropriately calculate the posture in the virtual three-dimensional space by controlling divergence in position while employing a simple configuration, can be provided.

(2) In the above posture information calculation device, the posture information calculation section may include:

a posture information update section that updates a given parameter necessary for specifying the posture angle and the position coordinates in the virtual three-dimensional space based on the three-axis angular velocity information and the three-axis acceleration information;

a posture information correction section that corrects the parameter updated by the posture information update section under a given constraint condition; and a posture information generation section that calculates the posture angle and the position coordinates in the virtual three-dimensional space based on the parameter corrected by the posture information correction section, the posture information update section may include a velocity vector update section that updates the fixed coordinate system velocity vector at a time k based on the inertial coordinate system acceleration vector and the fixed coordinate system velocity vector at a time k−1;

the posture information correction section may include a velocity vector correction section that corrects the fixed coordinate system velocity vector at the time k updated by the velocity vector update section under a constraint condition that a norm of the fixed coordinate system velocity vector is zero; and the posture information generation section may include a position coordinate generation section that generates the position coordinates in the virtual three-dimensional space corresponding to the fixed coordinate system velocity vector at the time k corrected by the velocity vector correction section.

According to the above posture information calculation device, the fixed coordinate system velocity vector is updated, and corrected under a constraint condition that the fixed coordinate system velocity vector is set to (0, 0, 0) (i.e., the norm is set to zero), and the position coordinates in the virtual three-dimensional space are generated corresponding to the corrected fixed coordinate system velocity vector. Therefore, since the position coordinates are generated so that the position coordinates are returned to predetermined coordinates (e.g., origin) linked to the fixed coordinate system velocity vector (0, 0, 0), divergence of the position coordinates due to the sensor offset can be effectively controlled.

Moreover, since the fixed coordinate system velocity vector is linked to the position coordinates in the virtual three-dimensional space instead of linking the fixed coordinate system position coordinates to the position coordinates in the virtual three-dimensional space, the rate at which the position coordinates are returned to the predetermined coordinates can be relatively easily adjusted to appropriately follow the sensor output.

(3) In the above posture information calculation device, the velocity vector update section may update the fixed coordinate system velocity vector at the time k by:

converting the inertial coordinate system acceleration vector into a fixed coordinate system acceleration vector by rotating the inertial coordinate system acceleration vector based on a fixed coordinate system posture angle vector at the time k−1;

subtracting a fixed coordinate system gravitational acceleration vector from the fixed coordinate system acceleration vector;

performing a first-order integration process on the subtraction result within a predetermined unit time to calculate a unit time fixed coordinate system velocity vector; and adding the unit time fixed coordinate system velocity vector to the fixed coordinate system velocity vector at the time k−1 corrected by the velocity vector correction section.

(4) In the above posture information calculation device, the position coordinate generation section may set the fixed coordinate system velocity vector at the time k corrected by the velocity vector correction section to be the position coordinates at the time k.

According to this configuration, since it is unnecessary to generate (calculate) the position coordinates from the corrected fixed coordinate system velocity vector, the amount of calculations can be reduced.

(5) In the above posture information calculation device, the posture information calculation section may calculate a fixed coordinate system posture angle vector based on an inertial coordinate system angular velocity vector obtained from the three-axis angular velocity information, and calculate the posture angle in the virtual three-dimensional space based on the fixed coordinate system posture angle vector;

the posture information update section may include a posture angle vector update section that updates the fixed coordinate system posture angle vector at the time k based on the inertial coordinate system angular velocity vector and the fixed coordinate system posture angle vector at the time k−1;

the posture information correction section may include a posture angle vector correction section that corrects the fixed coordinate system posture angle vector at the time k updated by the posture angle vector update section under a constraint condition based on the inertial coordinate system acceleration vector; and the posture information generation section may include a posture angle generation section that generates the posture angle in the virtual three-dimensional space based on the fixed coordinate system posture angle vector corrected by the posture angle vector correction section.

According to the above posture information calculation device, the fixed coordinate system posture angle vector is updated, and corrected under a constraint condition based on the inertial coordinate system acceleration vector, and the posture angle in the virtual three-dimensional space is generated based on the corrected fixed coordinate system posture angle vector. Therefore, since the posture angle based on the posture based on the current inertial coordinate system acceleration vector is generated, divergence of the posture angle due to the sensor offset can be controlled.

(6) In the above posture information calculation device, the posture angle vector update section may update the fixed coordinate system posture angle vector at the time k by performing a first-order integration process on the inertial coordinate system angular velocity vector within a predetermined unit time to calculate a unit time rotational angle quaternion, and calculating the fixed coordinate system posture angle vector at the time k−1 corrected by the posture angle vector correction section with the unit time rotational angle quaternion.

(7) In the above posture information calculation device, the posture angle generation section may set the fixed coordinate system posture angle vector at the time k corrected by the posture angle vector correction section to be the posture angle at the time k.

According to this configuration, since it is unnecessary to generate (calculate) the posture angle from the corrected fixed coordinate system posture angle vector, the amount of calculations can be reduced.

(8) In the above posture information calculation device, the sensor information acquisition section may receive temperature information detected by a temperature sensor;

the posture information update section may include:

an angular velocity offset update section that updates an offset of the three angular velocity sensors at the time k based on an offset of another angular velocity sensor associated with the temperature information and the offset of the three angular velocity sensors at the time k−1; and an acceleration offset update section that updates an offset of the three acceleration sensors at the time k based on an offset of another acceleration sensor associated with the temperature information and the offset of the three acceleration sensors at the time k−1; and the posture information correction section may include:

an angular velocity offset correction section that corrects the offset of the three angular velocity sensors at the time k updated by the angular velocity offset update section under a given constraint condition; and an acceleration offset correction section that corrects the offset of the three acceleration sensors at the time k updated by the acceleration offset update section under a given constraint condition.

This makes it possible to update the sensor offset taking account of a change in sensor offset due to temperature. Therefore, a drift due to the sensor offset is reduced, so that the speed at which the position coordinates or the posture angle is returned can be more easily adjusted. As a result, the position coordinates and the posture angle in the virtual three-dimensional space more promptly follow the sensor output.

(9) Another embodiment of the invention relates to a posture information calculation system including:

three angular velocity sensors that respectively detect three-axis angular velocity information that is information about angular velocities around three axes that are not parallel to one another;

three acceleration sensors that respectively detect three-axis acceleration information that is information about accelerations in three axial directions that are not parallel to one another; and the above posture information calculation device.

(10) Another embodiment of the invention relates to a posture information calculation method that calculates a posture angle and position coordinates in a virtual three-dimensional space based on three-axis angular velocity information detected by three angular velocity sensors, and three-axis acceleration information detected by three acceleration sensors, the three-axis angular velocity information being information about angular velocities around three axes that are not parallel to one another, and the three-axis acceleration information being information about accelerations in three axial directions that are not parallel to one another, the posture information calculation method comprising:

a sensor information acquisition step that acquires the three-axis angular velocity information, and the three-axis acceleration information; and a posture information calculation step that calculates the posture angle and the position coordinates in the virtual three-dimensional space based on the three-axis angular velocity information and the three-axis acceleration information acquired by the sensor information acquisition step, the posture information calculation step calculating a fixed coordinate system velocity vector based on an inertial coordinate system acceleration vector obtained from the three-axis acceleration information, and calculating the position coordinates in the virtual three-dimensional space corresponding to the fixed coordinate system velocity vector.

(11) Another embodiment of the invention relates to a computer-readable information storage medium storing a program that calculates a posture angle and position coordinates in a virtual three-dimensional space based on three-axis angular velocity information detected by three angular sensors, and three-axis acceleration information detected by three acceleration sensors, the three-axis angular velocity information being information about angular velocities around three axes that are not parallel to one another, and the three-axis acceleration information being information about accelerations in three axial directions that are not parallel to one another, the program causing a computer to function as:

a posture information calculation section that calculates the posture angle and the position coordinates in the virtual three-dimensional space based on the three-axis angular velocity information and the three-axis acceleration information, the posture information calculation section calculating a fixed coordinate system velocity vector based on an inertial coordinate system acceleration vector obtained from the three-axis acceleration information, and calculating the position coordinates in the virtual three-dimensional space corresponding to the fixed coordinate system velocity vector.

Preferred embodiments of the invention are described in detail below with reference to the drawings. Note that the following embodiments do not in any way limit the scope of the invention defined by the claims laid out herein. Note also that all of the elements described below should not be necessarily taken as essential requirements for the invention.

1. First Embodiment 1-1. Configuration of Posture Information Calculation System FIG. 1 is a schematic configuration diagram illustrating a posture information calculation system according to a first embodiment of the invention. As shown in FIG. 1, a posture information calculation system 1A according to the first embodiment includes a sensor information output device 10A and a posture information calculation device 20A.

The sensor information output device 10A includes gyro sensors (angular velocity sensors) 110X, 110Y, and 110Z that respectively detect angular velocity information around three axes (X-axis, Y-axis, and Z-axis) that intersect perpendicularly, and outputs the angular velocity information around the X-axis, the Y-axis, and the Z-axis. The sensor information output device 10A includes acceleration sensors 112X, 112Y, and 112Z that respectively detect acceleration information in three axial (X-axis, Y-axis, and Z-axis) directions that intersect perpendicularly, and outputs the acceleration information in the X-axis direction, the Y-axis direction, and the Z-axis direction.

The posture information calculation device 20A includes a sensor information acquisition section 210 and a posture information calculation section 220, and calculates a posture angle and position coordinates in a virtual three-dimensional space based on the information (angular velocity information and acceleration information) detected by the sensor information output device 10A.

The sensor information acquisition section 210 acquires the angular velocity information around the X-axis, the Y-axis, and the Z-axis respectively detected by the gyro sensors 110X, 110Y, and 110Z, and the acceleration information in the X-axis direction, the Y-axis direction, and the Z-axis direction respectively detected by the acceleration sensors 112X, 112Y, and 112Z (sensor information acquisition process). The posture information calculation section 220 calculates the posture angle and the position coordinates in the virtual three-dimensional space based on the angular velocity information around the X-axis, the Y-axis, and the Z-axis and the acceleration information in the X-axis direction, the Y-axis direction, and the Z-axis direction acquired by the sensor information acquisition section 210 (posture information calculation process). Specifically, the posture information calculation section 220 calculates a fixed coordinate system velocity vector (velocity vector in the actual three-dimensional space (fixed coordinate system)) based on an inertial coordinate system acceleration vector (acceleration vector in the sensor coordinate system (inertial coordinate system)), and calculates the position coordinates in the virtual three-dimensional space corresponding to the fixed coordinate system velocity vector. The posture information calculation section 220 calculates a fixed coordinate system posture angle vector (posture angle vector in the actual three-dimensional space (fixed coordinate system)) based on an inertial coordinate system angular velocity vector (angular velocity vector in the sensor coordinate system (inertial coordinate system)) obtained from the angular velocity information around the X-axis, the Y-axis, and the Z-axis, and calculates the posture angle in the virtual three-dimensional space based on the fixed coordinate system posture angle vector.

More specifically, the posture information calculation section 220 includes a posture information update section 230, a posture information correction section 240, and a posture information generation section 250, and calculates the posture angle and the position coordinates in the virtual three-dimensional space as described above. The posture information update section 230 updates a given parameter necessary for specifying the posture angle and the position coordinates in the virtual three-dimensional space based on the angular velocity information around the X-axis, the Y-axis, and the Z-axis and the acceleration information in the X-axis direction, the Y-axis direction, and the Z-axis direction (posture information update process). The posture information correction section 240 corrects the parameter updated by the posture information update section 240 under a given constraint condition (posture information correction process). The posture information generation section 250 generates the posture angle and the position coordinates in the virtual three-dimensional space based on the parameter corrected by the posture information correction section 240.

1-2. Configuration of Sensor Information Output Device

FIG. 2 is a diagram illustrating a configuration example of the sensor information output device 10A.

A sensor module 100 includes the gyro sensors 110X, 110Y, and 110Z and the acceleration sensors 112X, 112Y, and 112Z described with reference to FIG. 1. The gyro sensors 110X, 110Y, and 110Z are disposed so that the detection axes thereof intersect perpendicularly. Likewise, the acceleration sensors 112X, 112Y, and 112Z are disposed so that the detection axes thereof intersect perpendicularly. The gyro sensors 110X, 110Y, and 110Z and the acceleration sensors 112X, 112Y, and 112Z are disposed so that the detection axes of the gyro sensor 110X and the acceleration sensor 112X coincide with an identical direction (i.e., X-axis direction), the detection axes of the gyro sensor 110Y and the acceleration sensor 112Y coincide with an identical direction (i.e., Y-axis direction), and the detection axes of the gyro sensor 110Z and the acceleration sensor 112Z coincide with an identical direction (i.e., Z-axis direction).

The gyro sensor 110X outputs a direct voltage based on the angular velocity applied to the sensor module 100 around the X-axis, the gyro sensor 110Y outputs a direct voltage based on the angular velocity applied to the sensor module 100 around the Y-axis, and the gyro sensor 110Z outputs a direct voltage based on the angular velocity applied to the sensor module 100 around the Z-axis. The acceleration sensor 112X outputs a direct voltage based on the acceleration applied to the sensor module 100 in the X-axis direction, the acceleration sensor 112Y outputs a direct voltage based on the acceleration applied to the sensor module 100 in the Y-axis direction, and the acceleration sensor 112Z outputs a direct voltage based on the acceleration applied to the sensor module 100 in the Z-axis direction.

The voltages output from the gyro sensors 110X, 110Y, and 110Z are respectively amplified by amplifiers (AMP) 120X, 120Y, and 120Z, and passed through low-pass filters (LPF) 130X, 130Y, and 130Z to remove noise components.

Likewise, the voltages output from the acceleration sensors 112X, 112Y, and 112Z are respectively amplified by amplifiers (AMP) 122X, 122Y, and 122Z, and passed through low-pass filters (LPF) 132X, 132Y, and 132Z to remove noise components.

An A/D converter (ADC) 140 samples voltages $V_{GX}$, $V_{GY}$, $V_{GZ}$, $V_{AX}$, $V_{AY}$, and $V_{AZ}$ output from the low-pass filters (LPF) 130X, 130Y, 130Z, 132X, 132Y, and 132Z by time division, converts the voltages $V_{GX}$, $V_{GY}$, $V_{GZ}$, $V_{AX}$, $V_{AY}$, and $V_{AZ}$ into N-bit digital values GX, GY, GZ, AX, AY, and AZ, and outputs the digital values GX, GY, GZ, AX, AY, and AZ by time division.

The digital values GX, GY, and GZ are digital values (angular velocity information) based on the direction and the magnitude of the angular velocity applied to the sensor module 100 around the X-axis, the Y-axis, or the Z-axis, respectively, and the digital values AX, AY, and AZ are digital values (acceleration information) based on the direction and the magnitude of the acceleration applied to the sensor module 100 around the X-axis, the Y-axis, or the Z-axis, respectively. The digital values GX, GY, and GZ (angular velocity information) and the digital values AX, AY, and AZ (acceleration information) are transmitted to the posture information calculation device 20A from the sensor information output device 10A.

1-3. Configuration of Posture Information Calculation Device

FIG. 3 is a diagram illustrating a configuration example of the posture information calculation device 20A.

The posture information calculation device 20A includes an ADC interface circuit (ADC I/F) 212, a microcomputer interface circuit (microcomputer I/F) 214, and a microcomputer 300.

The ADC interface circuit (ADC I/F) 212 sequentially samples (acquires) the angular velocity information (GX, GY, GZ) and the acceleration information (AX, AY, AZ) output from the sensor information output device 10A by time division at an appropriate timing.

The microcomputer interface circuit (microcomputer I/F) 214 generates an angular velocity vector (inertial coordinate system angular velocity vector) G=(GX, GY, GZ) from the angular velocity information (GX, GY, GZ) acquired by the ADC interface circuit (ADC I/F) 212. The microcomputer interface circuit (microcomputer I/F) 214 also generates an acceleration vector (inertial coordinate system acceleration vector) A=(AX, AY, AZ) from the acceleration information (AX, AY, AZ) acquired by the ADC interface circuit (ADC I/F) 212. The microcomputer interface circuit (microcomputer I/F) 214 also performs various processes (e.g., bit extension or rounding process) depending on the specification of the microcomputer. The inertial coordinate system angular velocity vector G and the inertial coordinate system acceleration vector A thus generated are supplied to the microcomputer 300.

The ADC interface circuit (ADC I/F) 212 and the microcomputer interface circuit (microcomputer I/F) 214 function as the sensor information acquisition section 210 shown in FIG. 1.

The microcomputer 300 includes a processing section 310, a storage section 320, a communication section 330, and the like. An information storage medium 400 can be connected to the microcomputer 300.

The information storage medium 400 stores a program, data, and the like. The function of the information storage medium 400 may be implemented by hardware such as an optical disk (e.g., CD or DVD), a magneto-optical disk (MO), a magnetic disk, a hard disk, a magnetic tape, or a memory (ROM).

The storage section 320 serves as a work area for the processing section 310, the communication section 330, and the like. The function of the storage section 320 may be implemented by hardware such as a RAM.

The processing section 310 performs various processes using the storage section 320 as a work area based on a program (posture information calculation program) stored in the information storage medium 400, data read from the information storage medium 400, and the like. Specifically, a program that causes the microcomputer 300 (i.e., computer) to function as each section according to this embodiment (i.e., a program that causes a computer to execute the process of each section) is stored in the information storage medium 400. The function of the processing section 310 may be implemented by hardware such as a processor (e.g., CPU or DSP) or an ASIC (e.g., gate array), an application program, or an OS (e.g., general-purpose OS).

The communication section 330 controls communication with the outside (e.g., server device or another terminal). The function of the communication section 330 may be implemented by hardware such as a processor or a communication ASIC, a program, or the like.

In this embodiment, the processing section 310 includes a velocity vector update section 232, a posture angle vector update section 234, an angular velocity offset update section 236, and an acceleration offset update section 238.

The velocity vector update section 232 updates the fixed coordinate system velocity vector at a time k based on the inertial coordinate system acceleration vector (A) and the corrected fixed coordinate system velocity vector at a time k−1. For example, the velocity vector update section 232 may update the fixed coordinate system velocity vector at a time k by converting the inertial coordinate system acceleration vector (A) into the fixed coordinate system acceleration vector by rotating the inertial coordinate system acceleration vector (A) based on the fixed coordinate system posture angle vector at the time k−1, subtracting a fixed coordinate system gravitational acceleration vector from the fixed coordinate system acceleration vector, performing a first-order integration process on the subtraction result within a predetermined unit time Δt to calculate a unit time fixed coordinate system velocity vector (change in velocity within the unit time Δt), and adding the unit time fixed coordinate system velocity vector to the corrected fixed coordinate system velocity vector at the time k−1.

The posture angle vector update section 234 updates the fixed coordinate system posture angle vector at the time k based on the inertial coordinate system angular velocity vector (G) and the corrected fixed coordinate system posture angle vector at a time k−1. For example, the posture angle vector update section 234 may update the fixed coordinate system posture angle vector at the time k by performing a first-order integration process on the inertial coordinate system angular velocity vector (G) within the predetermined unit time Δt to calculate a unit time rotational angle quaternion (rotational angle within the unit time Δt), and calculating the corrected fixed coordinate system posture angle vector at the time k−1 with the unit time rotational angle quaternion. The angular velocity offset update section 236 updates the offset of the gyro sensors 110X, 110Y, and 110Z at the time k.

The acceleration offset update section 238 updates the offset of the acceleration sensors 112X, 112Y, and 112Z at the time k.

The velocity vector update section 232, the posture angle vector update section 234, the angular velocity offset update section 236, and the acceleration offset update section 238 function as the posture information update section 230 shown in FIG. 1.

In this embodiment, the processing section 310 includes a velocity vector correction section 242, a posture angle vector correction section 244, an angular velocity offset correction section 246, and an acceleration offset correction section 248.

The velocity vector correction section 242 corrects the fixed coordinate system velocity vector at the time k updated by the velocity vector update section 232 under a constraint condition that the norm of the fixed coordinate system velocity vector is zero.

The posture angle vector correction section 244 corrects the fixed coordinate system posture angle vector at the time k updated by the posture angle vector update section 234 under a constraint condition based on the inertial coordinate system acceleration vector (A).

The angular velocity offset correction section 246 corrects the offset of the gyro sensors 110X, 110Y, and 110Z at the time k updated by the angular velocity offset update section 236 under a given constraint condition.

The acceleration offset correction section 248 corrects the offset of the acceleration sensors 112X, 112Y, and 112Z at the time k updated by the acceleration offset update section 238 under a given constraint condition.

The velocity vector correction section 242, the posture angle vector correction section 244, the angular velocity offset correction section 246, and the acceleration offset correction section 248 function as the posture information correction section 240 shown in FIG. 1.

In this embodiment, the processing section 310 includes a position coordinate generation section 252 and a posture angle generation section 254.

The position coordinate generation section 252 generates the position coordinates in the virtual three-dimensional space corresponding to the fixed coordinate system velocity vector at the time k corrected by the velocity vector correction section 242. For example, the position coordinate generation section 252 may set (determine) the corrected fixed coordinate system velocity vector at the time k to be the position coordinates in the virtual three-dimensional space at the time k.

The posture angle generation section 254 generates the posture angle in the virtual three-dimensional space based on the corrected fixed coordinate system posture angle vector. For example, the posture angle generation section 254 may set (determine) the corrected fixed coordinate system posture angle vector at the time k to be the posture angle in the virtual three-dimensional space at the time k.

The position coordinate generation section 252 and the posture angle generation section 254 function as the posture information generation section 250 shown in FIG. 1.

The processing section 310 functions as the posture information calculation section 220 shown in FIG. 1 by utilizing each section that functions as the posture information correction section 240 and each section that functions as the posture information generation section 250.

A program (posture information calculation program) that causes a computer to function as each section according to this embodiment may be distributed to the information storage medium 400 (storage section 320) from an information storage medium included in a host device (server) through a network and the communication section 330. Use of the information storage medium included in the host device (server) is also included within the scope of the invention.

1-4. Posture Information Calculation Process 1-4-1. Outline

Figure 4A:
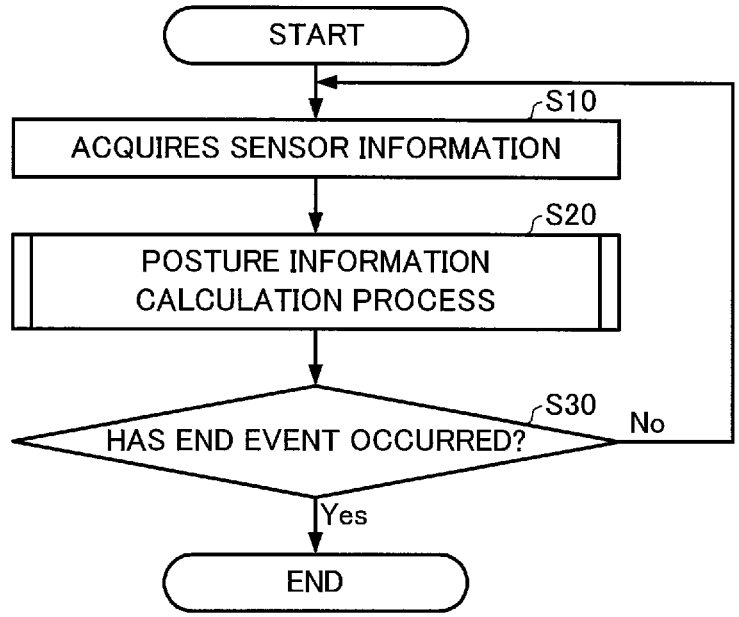
FIGS. 4A and 4B are flowcharts illustrating a process performed by a posture information calculation device.

FIG. 4A is a flowchart illustrating the process performed by the posture information calculation device 20A. As shown in FIG. 4A, the posture information calculation device 20A repeats the sensor information acquisition process using the sensor information acquisition section 210 and the posture information calculation process using the posture information calculation section 220 until an end event occurs (Yes in step S30).

Figure 4B:
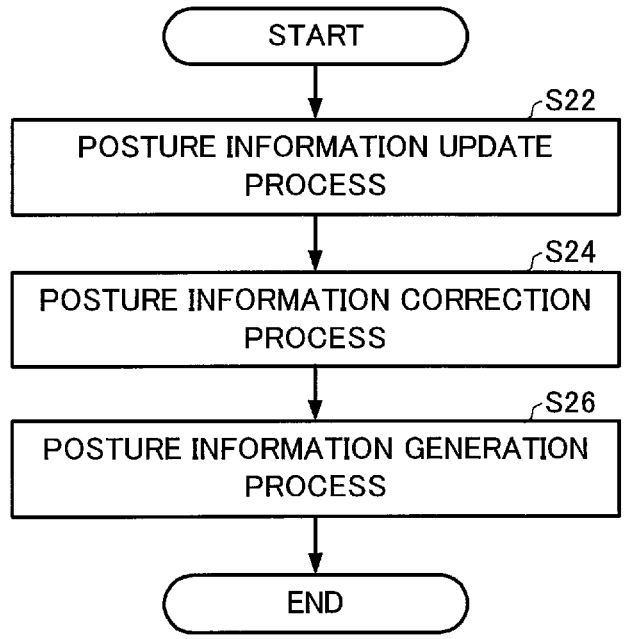

FIG. 4B is a flowchart illustrating the posture information calculation process performed by the posture information calculation section 220 (step S20 in FIG. 4A). As shown in FIG. 4B, the posture information calculation section 220 performs the posture information update process using the posture information update section 230 (step S22). Specifically, the velocity vector update section 232, the posture angle vector update section 234, the angular velocity offset update section 236, and the acceleration offset update section 238 perform the above processes.

The posture information calculation section 220 then performs the posture information correction process using the posture information correction section 240 (step S24). Specifically, the velocity vector correction section 242, the posture angle vector correction section 244, the angular velocity offset correction section 246, and the acceleration offset correction section 248 perform the above processes.

The posture information calculation section 220 then performs the posture information generation process using the posture information generation section 250 (step S26). Specifically, the position coordinate generation section 252 and the posture angle generation section 254 perform the above processes.

In this embodiment, the posture information calculation section 220 estimates the true value of the posture angle and the true values of the position coordinates in the virtual three-dimensional space by updating and correcting given parameters (variables) using a Kalman filter. The posture information calculation section 220 discretely performs the Kalman filter update process and the Kalman filter correction process at times 0, 1, . . . within the unit time $\Delta t$ (predetermined time). The unit time $\Delta t$ is appropriately determined based on the update cycle of the inertial coordinate system angular velocity vector G and the inertial coordinate system acceleration vector A, the specification of an application program that uses the posture information calculation system 1A, and the like. The configuration of the Kalman filter according to this embodiment is described in detail below.

1-4-2. Kalman Filter

Variables

In this embodiment, the following variables are used for the Kalman filter update process and the Kalman filter correction process.

$\Delta t$: Discrete integration short step time (sec)

$w_\omega$: Noise (mV) in angular velocity sensor having no temporal correlation and having an average value of zero $w_\alpha$: Noise (mV) in acceleration sensor having no temporal correlation and having an average value of zero $V_{gi}$: Angular velocity vector (mV) (inertial coordinate system) output from three angular velocity sensors $V_{ai}$: Acceleration vector (mV) (inertial coordinate system) output from three acceleration sensors $Se_g$: Sensitivity (mV/dps) of angular velocity sensor $Se_a$: Sensitivity (mV/(m/sec$^2$)) of acceleration sensor $b\omega_0$: Initial offset voltage (mV) of angular velocity sensor $b\alpha_0$: Initial offset voltage (mV) of acceleration sensor $b\hat{\omega}_k$: Updated offset voltage (mV) of angular velocity sensor at time k $b\omega_k$: Corrected offset voltage (mV) of angular velocity sensor at time k $b\hat{\alpha}_k$: Updated offset voltage (mV) of acceleration sensor at time k $b\alpha_k$: Corrected offset voltage (mV) of acceleration sensor at time k $\Delta Qt_g$: Triaxial short step time rotational angle quaternion (degrees)

$\hat{Qt}_k$: Updated posture angle vector (fixed coordinate system) at time k $Qt_k$: Corrected posture angle vector (fixed coordinate system) at time k $\Delta Ve_a$: Triaxial short step time velocity change (m/sec)

$\hat{Ve}_k$: Updated velocity vector (fixed coordinate system) at time k $Ve_k$: Corrected velocity vector (fixed coordinate system) at time k In this embodiment, the fixed coordinate system velocity vector $Ve_k$ ($\hat{Ve}_k$), the fixed coordinate system posture angle vector $Qt_k$ ($\hat{Qt}_k$), the offset voltage $b\omega_k$ ($b\hat{\omega}_k$) of the gyro sensor (110X, 110Y, 110Z), and the offset voltage $b\alpha_k$ ($b\hat{\alpha}_k$) of the acceleration sensor (112X, 112Y, 112Z) are set as the Kalman filter update/correction target parameters.

The fixed coordinate system velocity vector $Ve_k$ ($\hat{Ve}_k$) indicates the direction and the magnitude of the velocity of the sensor module 100 in the actual three-dimensional space. The fixed coordinate system posture angle vector $Qt_k$ ($\hat{Qt}_k$) indicates the posture angle of the sensor module 100 in the actual three-dimensional space. For example, a normal vector may be used as the fixed coordinate system posture angle vector $Qt_k$ ($\hat{Qt}_k$). The offset voltage $b\omega_k$ ($b\hat{\omega}_k$) of the gyro sensor is a voltage value output from the gyro sensor when an angular velocity is not applied (e.g., during a stationary state). The offset voltage $b\alpha_k$ ($b\hat{\alpha}_k$) of the acceleration sensor is a voltage value output from the acceleration sensor when an acceleration is not applied (e.g., during a stationary state).

Process

Figure 5:
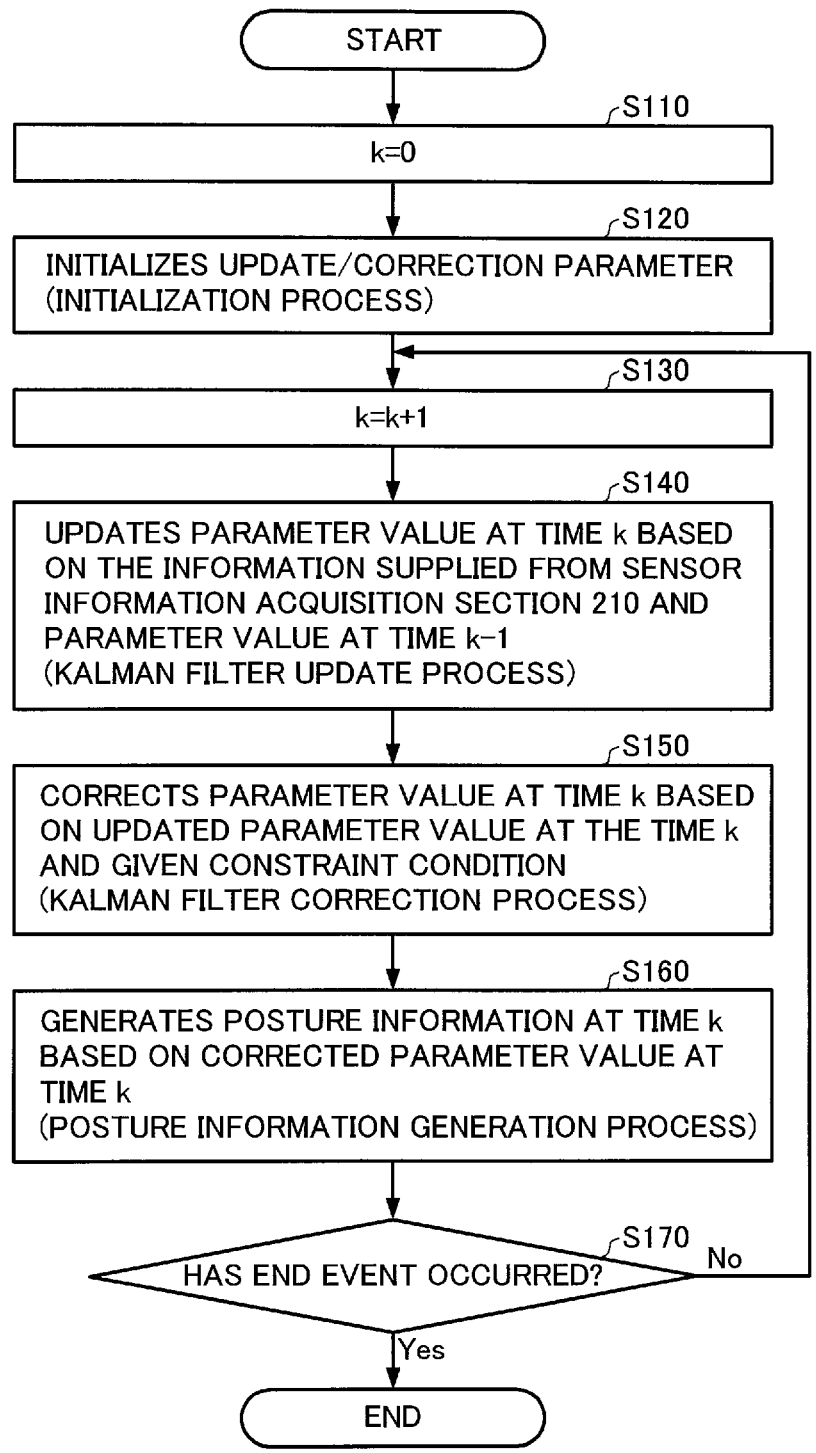
FIG. 5 is a flowchart illustrating a posture information calculation process by a posture information calculation section.

FIG. 5 is a flowchart illustrating the posture information calculation process using the Kalman filter. As shown in FIG. 5, the posture information calculation section 220 initializes a variable k that indicates the current time k to zero (step S110), and initializes the Kalman filter (initialization process; step S120). In the initialization process (step S120), the posture information calculation section 220 sets each Kalman filter update/correction target parameter to an initial value. A predetermined fixed value may be set as each of the parameters $Ve_0$, $Qt_0$, $b\omega_0$, and $b\alpha_0$. For example, a vector (0, 0, 0) (norm=0) may be set as the parameter $Ve_0$, a vertical direction unit vector (0, 0, −1) may be set as the parameter $Qt_0$, and the offset voltage value measured at a predetermined temperature (e.g., 25° C.) may be set as the parameters $b\omega_0$ and $b\alpha_0$. Alternatively, values may be measured during startup, and the measured values may be set as the parameters $Ve_0$, $Qt_0$, $b\omega_0$, and $b\alpha_0$. The final values of the preceding posture information calculation process may be set as the parameters $b\omega_0$ and $b\alpha_0$.

The posture information calculation section 220 then increments the time k by one (step S130), and performs the Kalman filter update process (step S140). In the update process (step S140), the posture information calculation section 220 updates the parameter value at the time k based on the information (inertial coordinate system angular velocity vector (G) and inertial coordinate system acceleration vector (A)) supplied from the sensor information acquisition section 210, and the parameter value at the time k−1.

The posture information calculation section 220 then performs the Kalman filter correction process (step S150). In the correction process (step S150), the posture information calculation section 220 corrects the parameter value at the time k based on the updated parameter value at the time k and a given constraint condition.

The posture information calculation section 220 then performs the posture information generation process (step S160). In the posture information generation process (step S160), the posture information calculation section 220 generates the posture information (i.e., the posture angle and the position coordinates in the virtual three-dimensional space) at the time k based on the corrected parameter value at the time k.

When a posture information calculation process end event has occurred before the unit time Δt has elapsed (Yes in step S170), the posture information calculation section 220 finishes the posture information calculation process. When a posture information calculation process end event has not occurred before the unit time Δt has elapsed (No in step S170), the posture information calculation section 220 increments the time k by one (step S130), and performs the Kalman filter update process (step S140), the Kalman filter correction process (step S150), and the posture information generation process (step S160).

The posture information calculation section 220 repeats the Kalman filter update process (step S140) and the Kalman filter correction process (step S150) every unit time Δt to generate new posture information until an end event occurs.

Kalman Filter Update Process

In the Kalman filter update process according to this embodiment, the parameters $b\omega_{k-1}$, $b\alpha_{k-1}$, $Qt_{k-1}$, and $Ve_{k-1}$ (or the initial values $b\omega_0$, $b\alpha_0$, $Qt_0$, and $Ve_0$) corrected at the time k−1 by the correction process described later are respectively updated to $b\hat{\omega}_k$, $b\hat{\alpha}_k$, $\hat{Qt}_k$, and $\hat{Ve}_k$ at the time k.

An update expression used for an extended Kalman filter is shown by the following expression (1).

$$\hat{X}_k = f(X_{k-1}, u, w_{k-1}) \tag{1}$$

where, $\hat{X}_k = (b\hat{\omega}_k, b\hat{\alpha}_k, \hat{Qt}_k, \hat{Ve}_k)^t$, $X_{k-1} = (b\omega_{k-1}, b\alpha_{k-1}, Qt_{k-1}, Ve_{k-1})^t$, $u = (V_{gi}, V_{ai})$, and $w_{k-1} = (w_\omega, w_\alpha)$. The expression (1) indicates that the updated parameter $\hat{X}_k$ at the time k is obtained by applying the function $f$ to the corrected parameter $X_{k-1}$ at the time k−1, the sensor output value u, and the sensor noise $w_{k-1}$. Since the function $f$ is very complex, an enormous amount of calculations are required to strictly calculate the expression (1). Therefore, it is not practical to use the expression (1) when it is desired to calculate the posture information in real time. In this embodiment, a Jacobian $F_{k-1}$ of the function $f$ is defined, and the following update expression (2) is used.

$$\hat{X}_k = F_{k-1} \times X_{k-1} \tag{2}$$

When using the update expression (2), the parameter $\hat{X}_k$ is obtained by calculating the matrix product of $F_{k-1}$ and $X_{k-1}$. Therefore, the update expression (2) is suitable when calculating the posture information in real time. Since $\hat{X}_k = (b\hat{\omega}_k, b\hat{\alpha}_k, \hat{Qt}_k, \hat{Ve}_k)^t$ and $X_{k-1} = (b\omega_{k-1}, b\alpha_{k-1}, Qt_{k-1}, Ve_{k-1})^t$, the Jacobian $F_{k-1}$ can be calculated by defining update expressions that calculate the parameters $b\hat{\omega}_k$, $b\hat{\alpha}_k$, $\hat{Qt}_k$, and $\hat{Ve}_k$, and applying matrix transformation so that the relationship between the update expressions is satisfied.

In this embodiment, update expressions that calculate the parameters $b\hat{\omega}_k$ and $b\hat{\alpha}_k$ are defined by the following expressions (3) and (4).

$$b\hat{\omega}_k := b\omega_{k-1} \tag{3}$$

$$b\hat{\alpha}_k := b\alpha_{k-1} \tag{4}$$

An update expression that calculate the parameter $Qt_k$ is defined by the following expression (5).

$$\hat{Qt}_k := \Delta Qt_g^* \times Qt_{k-1} \times \Delta Qt_g \tag{5}$$

$\Delta Qt_g$ in the expression (5) is calculated by the following expression (6).

$$\Delta Qt_g = \omega \cdot \Delta t \tag{6}$$

in the expression (6) is calculated by the following expression (7).

$$\omega = \phi((ar_x, ar_y, ar_z)) = 1 + i \cdot ar_x/2 + j \cdot ar_y/2 + k \cdot ar_z/2 \tag{7}$$

where, the function $\phi$ is a function that converts the angular velocity vector into a quaternion, and i, j, and k are quaternion bases. $(ar_x, ar_y, ar_z)$ is the angular velocity vector in the inertial coordinate system (inertial coordinate system angular velocity vector), and $ar_x$, $ar_y$, and $ar_z$ are angular velocities around the X-axis, the Y-axis, and the Z-axis, respectively. The angular velocity vector $(ar_x, ar_y, ar_z)$ is calculated by the following expression (8).

$$(ar_x, ar_y, ar_z) = (V_{gi} - b\omega_{k-1})/Se_g \tag{8}$$

An update expression that calculate the parameter $\hat{Ve}_k$ is defined by the following expression (9).

$$\hat{Ve}_k := Ve_{k-1} + \Delta Ve_a \tag{9}$$

The parameter $\Delta Ve_a$ is calculated by the following expression (10).

$$\Delta Ve_a = ((\rho(Qt_{k-1}))^* \times (gr_x, gr_y, gr_z) \times (\rho(Qt_{k-1})) - G) \times \Delta t \tag{10}$$

where, the function $\rho$ is a function that converts the parameter $Qt_{k-1}$ into a rotation quaternion from the initial posture angle vector $Qt_0$ to $Qt_{k-1}$. $(\rho(Qt_{k-1}))^*$ is a conjugated quaternion of $(\rho(Qt_{k-1}))$. G is the gravitational acceleration vector. $(gr_x, gr_y, gr_z)$ is the acceleration vector in the inertial coordinate system (inertial coordinate system acceleration vector), and $gr_x$, $gr_y$, and $gr_z$ are accelerations in the X-axis direction, the Y-axis direction, and the Z-axis direction, respectively. The acceleration vector $(gr_x, gr_y, gr_z)$ is calculated by the following expression (11).

$$(gr_x, gr_y, gr_z) = (V_{ai} - b\alpha_{k-1})/Se_a \tag{11}$$

The Jacobian $F_{k-1}$ can be calculated by applying matrix transformation so that the update expressions (3), (4), (5), and (9) are satisfied.

In the Kalman filter update process according to this embodiment, a covariance matrix $P_{k-1}(:E[\text{epsilon}_{k-1}, \text{epsilon}_{k-1}^t])$ of a residual error between the parameter $X_{k-1}$ corrected by the correction process described later at the time k−1 and the true value is updated to $\hat{P}_k$ using the Jacobian $F_{k-1}$ at the time k. An update expression that calculate the covariance matrix $\hat{P}_k$ is defined by the following expression (12).

$$\hat{P}_k := F_{k-1} P_{k-1} (F_{k-1})^t + Q_{k-1} \tag{12}$$

where, $Q_{k-1}(:E[w_{k-1}, w_{k-1}^t])$ is a covariance matrix of the sensor noise $w_{k-1}$.

Figure 6:
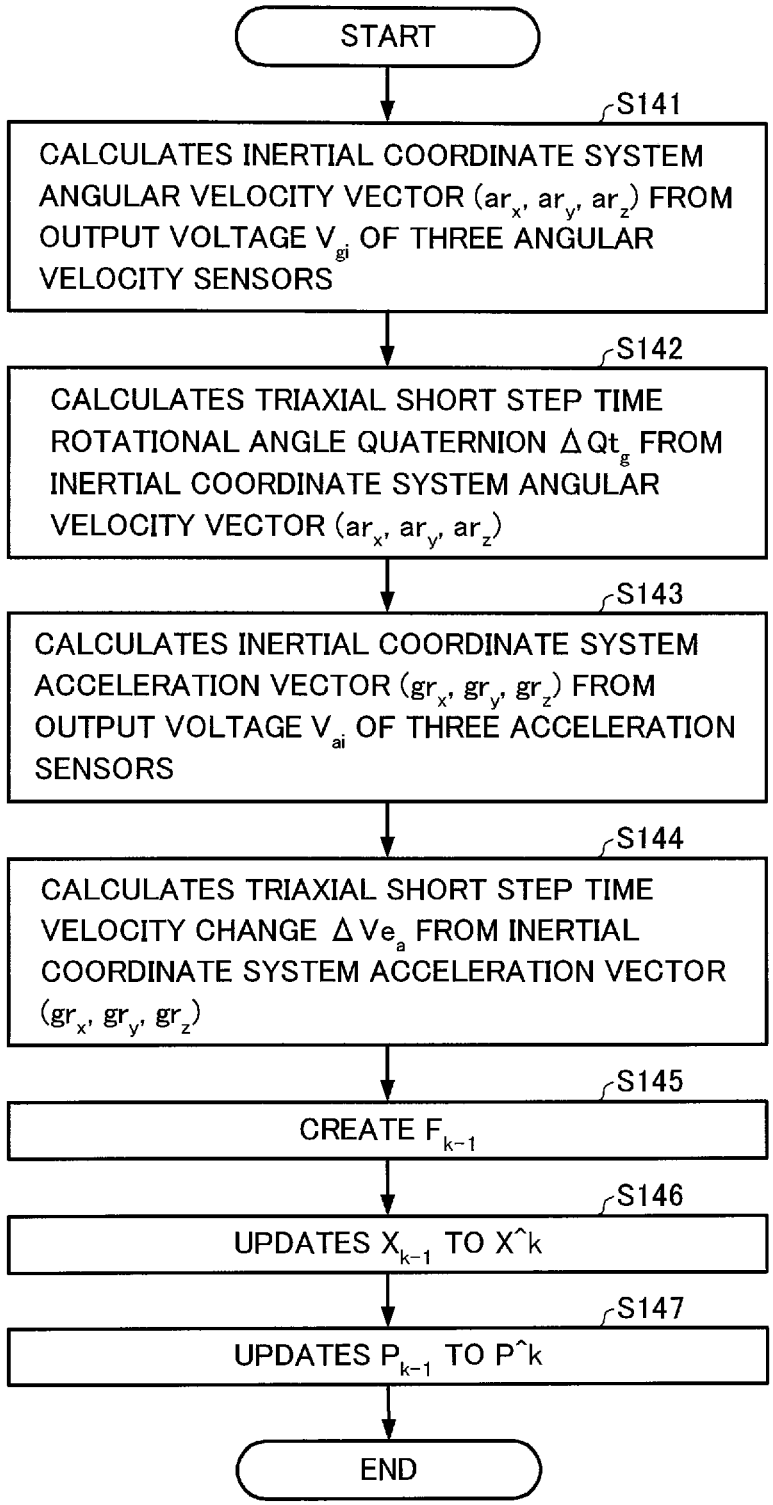
FIG. 6 is a flowchart illustrating an example of a Kalman filter update process.

An example of the Kalman filter update process is described below. FIG. 6 is a flowchart illustrating an example of the Kalman filter update process according to this embodiment.

The inertial coordinate system angular velocity vector ($ar_x$, $ar_y$, $ar_z$) is calculated from the output voltage $V_{gi}$ of the gyro sensors 110X, 110Y, and 110Z using the expression (8) (step S141).

The triaxial short step time rotational angle quaternion $\Delta Qt_g$ is calculated from the inertial coordinate system angular velocity vector ($ar_x$, $ar_y$, $ar_z$) calculated in the step S141 using the expressions (6) and (7) (step S142).

The inertial coordinate system acceleration vector ($gr_x$, $gr_y$, $gr_z$) is calculated from the output voltage $V_{ai}$ of the acceleration sensors 112X, 112Y, and 112Z using the expression (11) (step S143).

The triaxial short step time velocity change $\Delta Ve_a$ is calculated from the inertial coordinate system acceleration vector calculated in the step S143 using the expression (10) (step S144).

The Jacobian $F_{k-1}$ is created by applying matrix transformation so that the expressions (3), (4), (5), and (9) are satisfied using the triaxial short step time rotational angle quaternion $\Delta Qt_g$ calculated in the step S142 and the triaxial short step time velocity change $\Delta Ve_a$ calculated in the step S144 (step S145).

The matrix product of $F_{k-1}$ and $X_{k-1}$ is calculated using update expression (2) to update $X_{k-1}$ to $\hat{X}_k$ (step S146).

The covariance matrix $P_{k-1}$ is then updated to $\hat{P}_k$ using the update expression (12) (step S147).

Kalman Filter Correction Process

In the Kalman filter correction process according to this embodiment, the parameters $b\hat{\omega}_k$, $b\hat{\alpha}_k$, $\hat{Qt}_k$, and $\hat{Ve}_k$ at the time k updated by the update process are respectively corrected to $b\omega_k$, $b\alpha_k$, $Qt_k$, and $Ve_k$ at the time k. The following observation equation (13) is defined in the Kalman filter correction process.

$$y = Z - HX \qquad (13)$$

where, Z is an observed value vector, X is the calculation target value, y is an observation residual error, and H is an observation equation slope component matrix.

In the Kalman filter correction process, the value X is calculated so that the observation residual error y in the observation equation (13) becomes a minimum (i.e., an evaluation function $J_{WLS}$ defined by the following expression (14) becomes a minimum).

$$J_{WLS} = (Z - HX)^t W (Z - HX) \qquad (14)$$

where, W is a symmetric matrix that indicates weight.

In this embodiment, the value X corresponds to $X_k = (b\omega_k, b\alpha_k, Qt_k, Ve_k)^t$, the observed value vector Z corresponds to the observed value vector $Z_k$ at the time k, and the observation equation slope component matrix H corresponds to the observation equation slope component matrix $H_{k-1}$ at the time k−1. Note that the observation equation slope component matrix $H_{k-1}$ may be calculated each time, or may be a fixed value.

A correction expression used in this embodiment is defined by the following expression (15).

$$X_k := \hat{X}_k + K_k(Z_k - H_{k-1}\hat{X}_k) \qquad (15)$$

where, $K_k$ is a Kalman gain, and is defined by the following expression (16).

$$K_k := \hat{P}_k H_{k-1}{}^t (S_k)^{-1} \qquad (16)$$

$S_k$ is defined by the following expression (17).

$$S_k := H_{k-1} \hat{P}_k H_{k-1}{}^t + R_{k-1} \qquad (17)$$

$R_{k-1}$ is defined by the following expression (18).

$$R_{k-1} := W^{-1} \qquad (18)$$

The correction expression (15) corrects the value $\hat{X}_k$ so that the evaluation function $J_{WLS}$ becomes a minimum. This means that the correction process is performed so that the value $Z_k - H_{k-1}X_k$ becomes a minimum (i.e., the value $H_{k-1}X_k$ approaches the observed value vector $Z_k$). Therefore, it is desirable that the observed value vector Zk be the most probable value in order to improve the estimation accuracy of the true value of the value $X_k$.

In this embodiment, the acceleration vector ($gr_x$, $gr_y$, $gr_z$) (=$V_{ai} - b\alpha_{k-1}/Se_a$) calculated from the output voltage of the acceleration sensors 112X, 112Y, and 112Z using the expression (11) is used as the observed value used to correct the updated posture angle vector $\hat{Qt}_k$ at the time k. Since only the gravitational acceleration is applied to the acceleration sensor when the sensor module 100 is stationary, the posture angle vector $\hat{Qt}_k$ can be corrected based on the gravitational force direction calculated from the output voltage of the acceleration sensors 112X, 112Y, and 112Z. This makes it possible to correct a horizontal plane drift due to an offset error of the gyro sensors 110X, 110Y, and 110Z.

In this embodiment, the origin (0, 0, 0) is used as the observed value used to correct the updated velocity vector $\hat{Ve}_k$ at the time k. Specifically, the corrected velocity vector $Ve_k$ at the time k approaches the origin (0, 0, 0). In this embodiment, the velocity vector $Ve_k$ is defined as the position coordinates in the virtual three-dimensional space. Therefore, the position coordinates in the virtual three-dimensional space are returned to the origin (0, 0, 0) when the sensor module 100 is stationary. This makes it possible to correct a drift of the position coordinates in the virtual three-dimensional space due to an offset error of the acceleration sensors 112X, 112Y, and 112Z.

In the Kalman filter correction process according to this embodiment, the covariance matrix $\hat{P}_k$ updated by the update process at the time k is corrected to $P_k$ using the Kalman gain $K_k$ and the observation equation slope component matrix $H_{k-1}$ at the time k. A correction expression for the covariance matrix $\hat{P}_k$ is defined by the following expression (19).

$$P_k := (I - K_k H_{k-1})\hat{P}_k \qquad (19)$$

Figure 7:
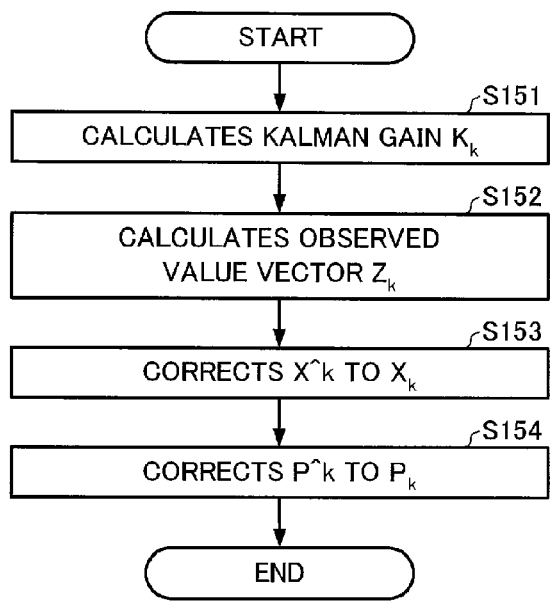
FIG. 7 is a flowchart illustrating an example of a Kalman filter correction process.

An example of the Kalman filter correction process is described below. FIG. 7 is a flowchart illustrating an example of the Kalman filter correction process according to this embodiment.

The Kalman gain $K_k$ is calculated using the expressions (16), (17), and (18) (step S151).

The observed value vector $Z_k$ is then calculated (step S152). In this embodiment, the acceleration vector ($gr_x$, $gr_y$, $gr_z$) is calculated as the observed value used to correct the updated posture angle vector $\hat{Qt}_k$, and the origin (0, 0, 0) is used as the observed value used to correct the updated velocity vector $\hat{Ve}_k$. The observed value used to correct the updated offset voltage $b\hat{\omega}k$ and the observed value used to correct the updated offset voltage $b\hat{\alpha}_k$ may be calculated by known expressions.

The parameter $\hat{X}_k$ is corrected to $X_k$ using the correction expression (15) (step S153).

The covariance matrix $\hat{P}_k$ is then corrected to $P_k$ using the correction expression (19) (step S154).

1-5. Effects

According to this embodiment, the fixed coordinate system velocity vector obtained by converting the acceleration vector in the inertial coordinate system (sensor coordinate system) into the fixed coordinate system acceleration vector, and performing a first-order integration process on the fixed coordinate system acceleration vector is linked to the position coordinates in the virtual three-dimensional space. This makes it possible to return the fixed coordinate system velocity vector to the origin at a velocity proportional to the product of the norm and the Kalman gain, so that the position coordinates can be stably generated even if a certain time has elapsed after the system has been activated. More specifically, the fixed coordinate system velocity vector is updated, and corrected under the constraint condition that the fixed coordinate system velocity vector is set to (0, 0, 0), and the position coordinates in the virtual three-dimensional space are generated corresponding to the corrected fixed coordinate system velocity vector. Therefore, since the position coordinates are generated so that the position coordinates are returned to the origin, divergence of the position coordinates due to the sensor offset can be effectively controlled. Since the velocity vector is obtained by performing a first-order integration process on the acceleration vector, a drift of the position coordinates is made proportional to the sensor offset (i.e., is not proportional to the second power of the sensor offset) (i.e., a rapid increase is avoided) by linking the velocity vector to the position coordinates, so that the Kalman gain can be relatively reduced.

According to this embodiment, the fixed coordinate system posture angle vector obtained by converting the angular velocity vector in the inertial coordinate system (sensor coordinate system) into the fixed coordinate system angular velocity vector, and performing a first-order integration process on the fixed coordinate system angular velocity vector is linked to the posture angle in the virtual three-dimensional space. This prevents a rapid increase in drift of the posture angle due to the sensor offset, so that the Kalman gain can be relatively reduced.

According to this embodiment, since the corrected fixed coordinate system velocity vector and the corrected fixed coordinate system posture angle vector are respectively used as the position coordinates and the posture angle in the virtual three-dimensional space, it is unnecessary to calculate (generate) the position coordinates, so that the amount of calculations can be reduced.

According to this embodiment, since the position can be calculated using an inertial sensor when it is necessary for the user application to use the posture, it is unnecessary to provide an external sensor, and transmit the acceleration data to a system provided with an inertial sensor or a user application outside the system.

Since the position calculation system can formed by only the system provided with the inertial sensor, it is unnecessary to use a communication interface between a plurality of systems. Moreover, it is unnecessary to use large hardware or system resources.

When using a 3D window for the GUI of the system, and using a sensor module as a pointing device, a system that physically reflects module inertial force information (angular velocity information and acceleration information) in the 3D window is normally used. In this case, it is possible to propose an algorithm that calculates the posture including the position (3D window).

According to this embodiment, the posture information in the virtual three-dimensional space can be appropriately calculated by controlling divergence of the position coordinates and the posture angle while utilizing a simple configuration.

Figure 8:
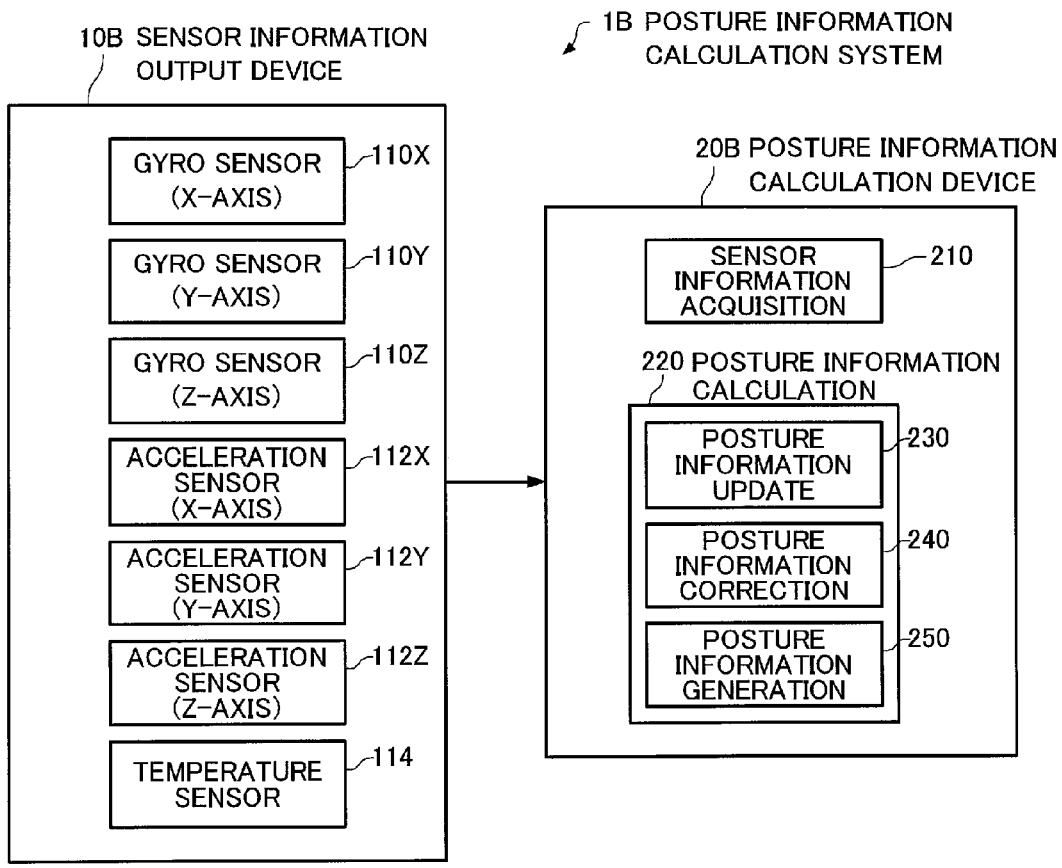
FIG. 8 is a schematic configuration diagram illustrating a posture information calculation system according to a second embodiment of the invention.

2. Second embodiment 2-1. Configuration of Posture Information Calculation System FIG. 8 is a schematic configuration diagram illustrating a posture information calculation system according to a second embodiment. As shown in FIG. 8, a posture information calculation system 1B according to the second embodiment differs from the posture information calculation system 1A according to the first embodiment in that a sensor information output device 10B includes a temperature sensor 114. Specifically, the sensor information output device 10B outputs temperature information in addition to the angular velocity information and the acceleration information in three axial (X-axis, Y-axis, and Z-axis) directions that intersect perpendicularly.

The posture information calculation device 20B calculates the posture angle and the position coordinates in the virtual three-dimensional space based on the information (acceleration information, angular velocity information, and temperature information) detected by the sensor information output device 10B.

2-2. Configuration of Sensor Information Output Device

Figure 9:
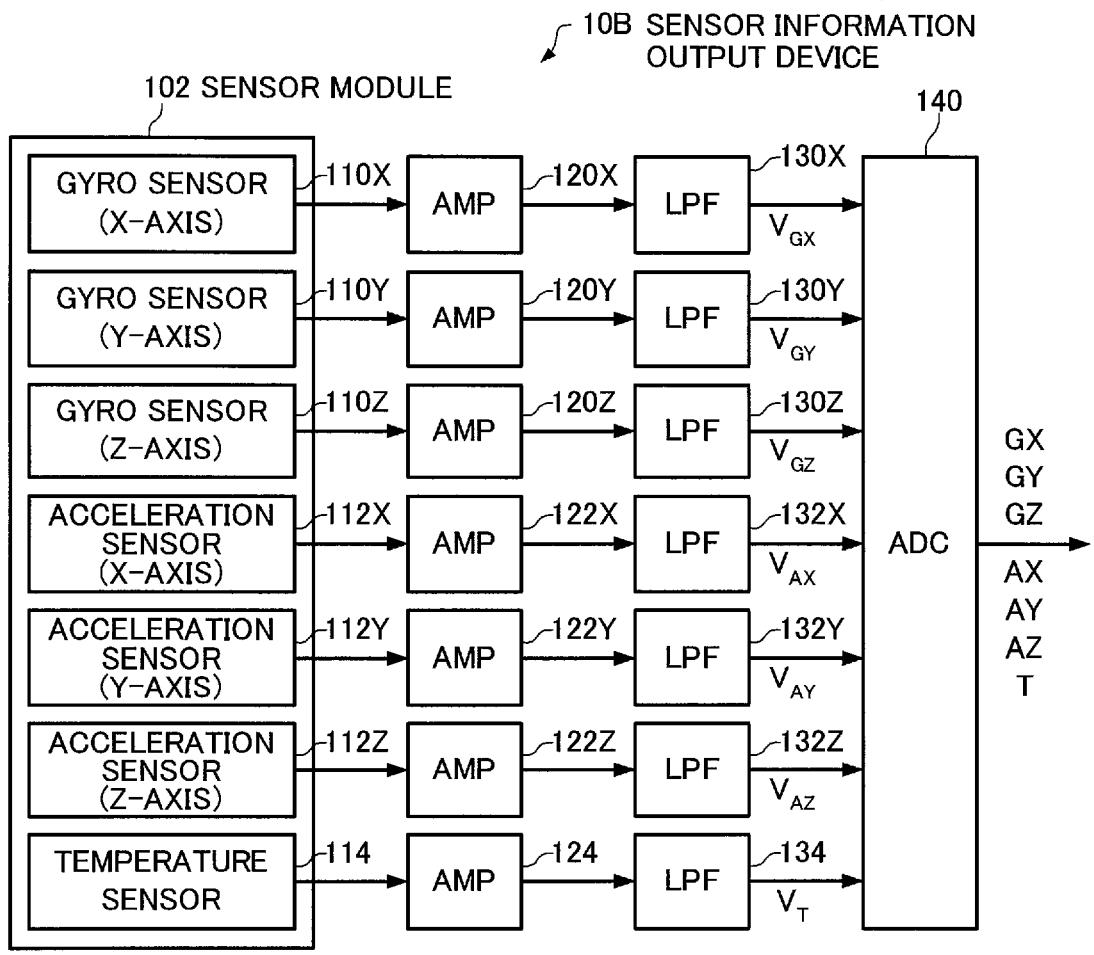
FIG. 9 is a diagram illustrating a configuration example of a sensor information output device.

FIG. 9 is a diagram illustrating a configuration example of the sensor information output device 10B. A sensor module 102 includes gyro sensors 110X, 110Y, and 110Z and acceleration sensors 112X, 112Y, and 112Z in the same manner as the sensor module 100 according to the first embodiment. The sensor module 102 also includes a temperature sensor 114 near the gyro sensors 110X, 110Y, and 110Z and the acceleration sensors 112X, 112Y, and 112Z. The temperature sensor 114 outputs a direct voltage based on the ambient temperature.

The voltage output from the temperature sensor 114 is amplified by an amplifier (AMP) 124, and passed through a low-pass filter (LPF) 134 to remove noise components. An A/D converter (ADC) 140 samples voltages $V_{GX}$, $V_{GY}$, $V_{GZ}$, $V_{AX}$, $V_{AY}$, $V_{AZ}$, and $V_T$ output from the low-pass filters (LPF) 130X, 130Y, 130Z, 132X, 132Y, 132Z, and 134 by time division, converts the voltages $V_{GX}$, $V_{GY}$, $V_{GZ}$, $V_{AX}$, $V_{AY}$, $V_{AZ}$, and $V_T$ into N-bit digital values GX, GY, GZ, AX, AY, AZ, and T (T is a digital value (temperature information) based on the ambient temperature measured by the temperature sensor 114), and outputs the digital values GX, GY, GZ, AX, AY, AZ, and T by time division. The digital values GX, GY, and GZ (angular velocity information), the digital values AX, AY, and AZ (acceleration information), and the digital value T (temperature information) are transmitted to the posture information calculation device 20B from the sensor information output device 10B.

The sensor information output device 10B is configured in the same as the sensor information output device 10A except for the above features.

2-3. Configuration of Posture Information Calculation Device

Figure 10:
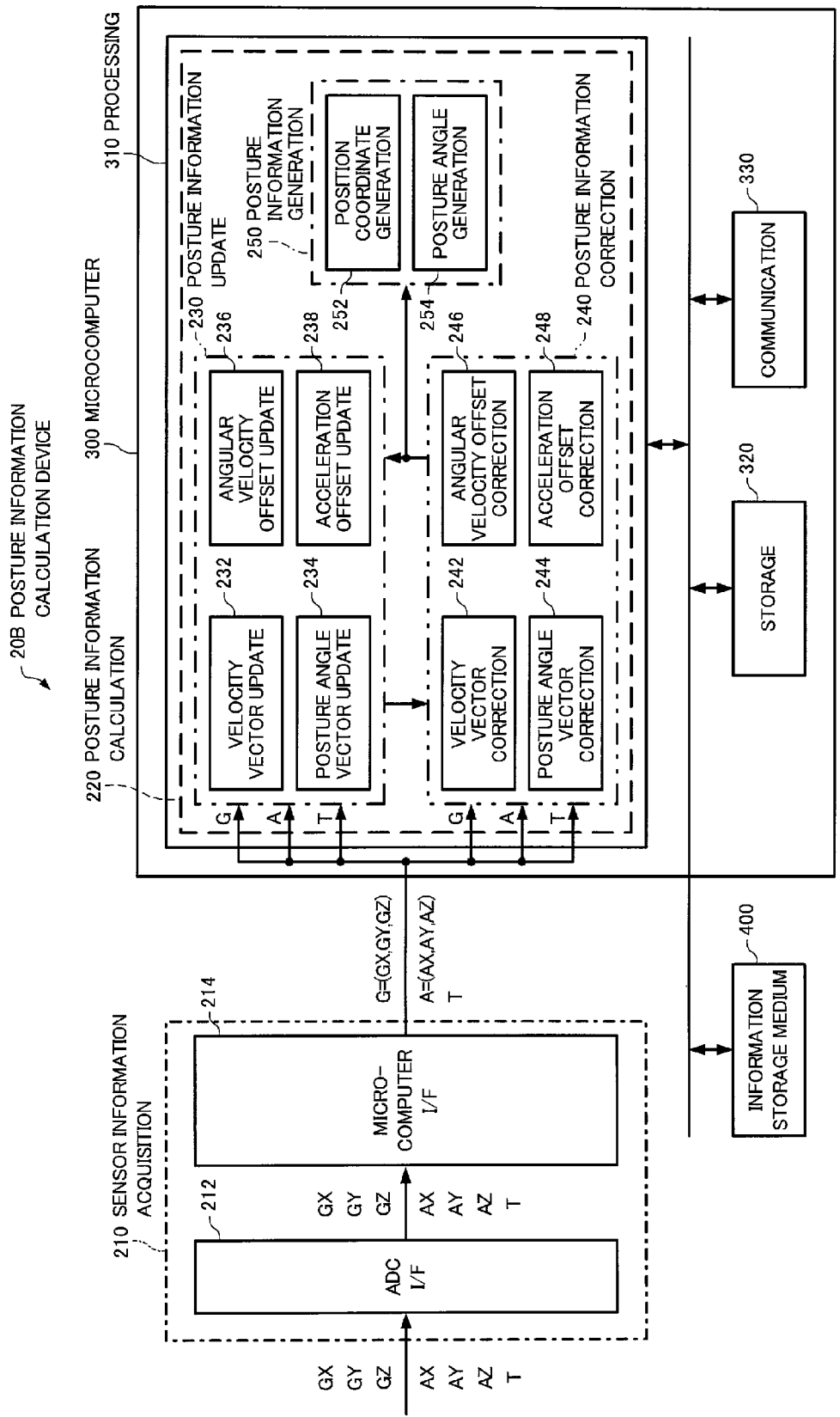
FIG. 10 is a diagram illustrating a configuration example of a posture information calculation device.

FIG. 10 is a diagram illustrating a configuration example of the posture information calculation device 20B.

An ADC interface circuit (ADC I/F) 212 of the posture information calculation device 20B sequentially samples (acquires) the angular velocity information (GX, GY, GZ), the acceleration information (AX, AY, AZ), and the temperature information (T) output from the sensor information output device 10B by time division at an appropriate timing.

A microcomputer interface circuit (microcomputer I/F) 214 generates an inertial coordinate system angular velocity vector (G) and an inertial coordinate system acceleration vector (A) in the same manner as in the posture information calculation device 20A according to the first embodiment, and supplies the temperature information T to the microcomputer 300 in addition to the inertial coordinate system angular velocity vector G and the inertial coordinate system acceleration vector A.

The configuration of the microcomputer 300 is the same as that of the posture information calculation device 20A except for the functions of the angular velocity offset update section 236 and the acceleration offset update section 238.

The angular velocity offset update section 236 updates the offset of the gyro sensors 110X, 110Y, and 110Z at the time k based on the temperature information (T) and the corrected offset of the gyro sensors 110X, 110Y, and 110Z at the time k−1. For example, the angular velocity offset update section 236 may update the offset of the gyro sensors 110X, 110Y, and 110Z at the time k by adding an offset correction value obtained referring to the relationship between the temperature information (T) and the offset correction value of the gyro sensors 110X, 110Y, and 110Z to the offset of the gyro sensors 110X, 110Y, and 110Z at the time k−1.

The acceleration offset update section 238 updates the offset of the acceleration sensors 112X, 112Y, and 112Z at the time k based on the temperature information (T) and the corrected offset of the acceleration sensors 112X, 112Y, and 112Z at the time k−1. For example, the acceleration offset update section 238 may update the offset of the acceleration sensors 112X, 112Y, and 112Z at the time k by adding an offset correction value obtained referring to the relationship between the temperature information (T) and the offset correction value of the acceleration sensors 112X, 112Y, and 112Z to the offset of the acceleration sensors 112X, 112Y, and 112Z at the time k−1.

The posture information calculation device 20B is configured in the same as the posture information calculation device 20A except for the above features.

2-4. Posture Information Calculation Process 2-4-1. Outline

The overall process performed by the posture information calculation device 20B according to the second embodiment is the same as the process described with reference to FIGS. 4A and 4B.

The configuration of a Kalman filter according to the second embodiment is described in detail below.

2-4-2. Kalman Filter

Variables

In the Kalman filter update process and the Kalman filter correction process according to the second embodiment, the following variables are used in addition to the variable described in connection with the first embodiment.

$Se_t$: Temperature sensitivity (mV/° C.)

$V_t$: Output value (mV) of temperature sensor

The variables (parameters) $b\omega_k$ ($b\hat{\omega}_k$), $b\alpha_k$($b\hat{\alpha}_k$), $Qt_k$ ($Q\hat{t}_k$), and $Ve_k$ ($V\hat{e}_k$) are subjected to the Kalman filter update process and the Kalman filter correction process according to the second embodiment in the same manner as in the first embodiment.

Process

The posture information calculation process according to the second embodiment using the Kalman filter is the same as the process described with reference to FIG. 5. In the second embodiment, however, the Kalman filter update process (step S140) includes updating the parameter value at the time k based on the inertial coordinate system angular velocity vector (G), the inertial coordinate system acceleration vector (A), the temperature information (T), and the parameter value at the time k−1.

Kalman Filter Update Process

The second embodiment differs from the first embodiment as to the update expressions (3) and (4) among the update expressions (3), (4), (5), and (9) described in connection with the first embodiment.

In the second embodiment, the update expression that calculates the parameter $b\hat{\omega}_k$ is defined by the following expression (20).

$$b\hat{\omega}_k := b\omega_{k-1} + b\omega(T) \tag{20}$$

The function $b\omega$ is a function that converts the temperature T into an angular velocity sensor offset correction voltage value. The temperature T is calculated by the following expression (21).

$$T = V_t / Se_t \tag{21}$$

In the second embodiment, the update expression that calculate the parameter $b\hat{\alpha}_k$ is defined by the following expression (22).

$$b\hat{\alpha}_k := b\alpha_{k-1} + b\alpha(T) \tag{22}$$

The function $b\alpha$ is a function that converts the temperature T into an acceleration sensor offset correction voltage value. The temperature T is calculated by the expression (21).

The Kalman filter update process according to the second embodiment is the same as that of the first embodiment except for the above features.

Figure 11:
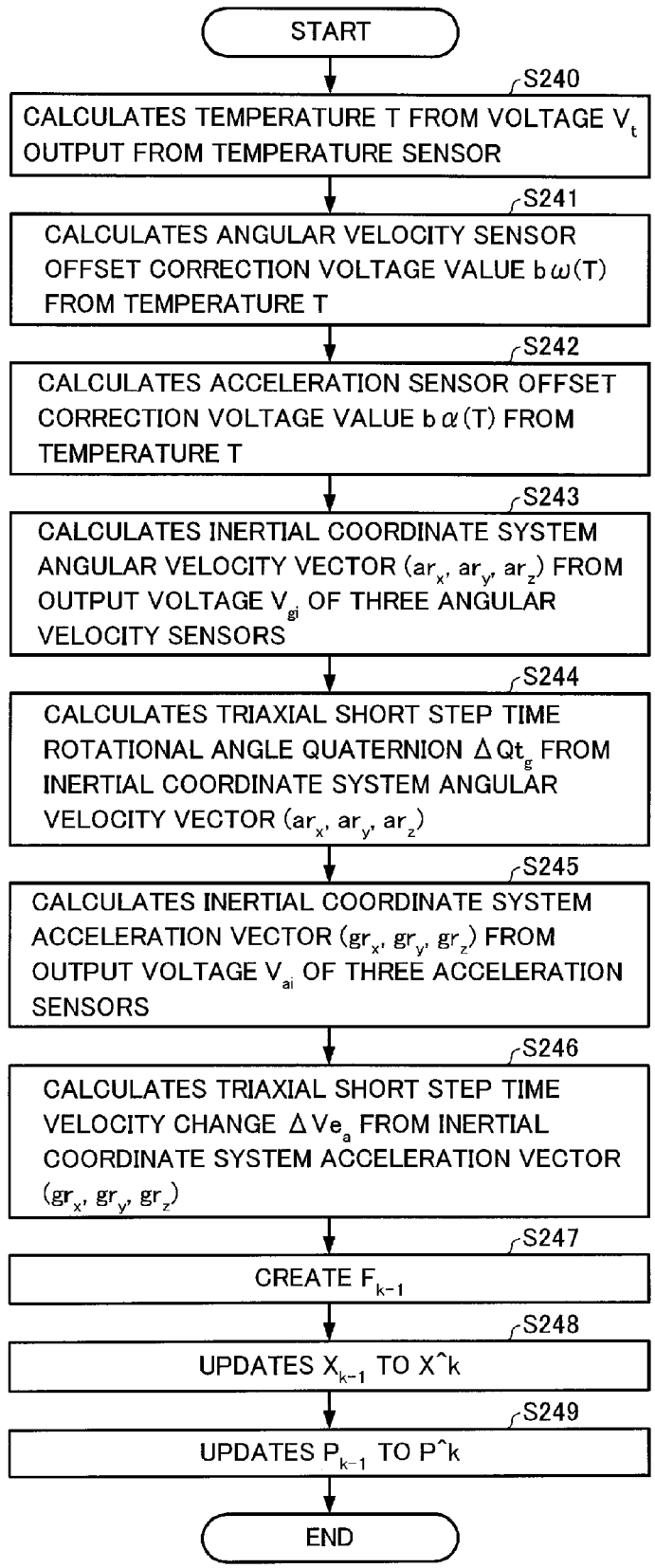
FIG. 11 is a flowchart illustrating an example of a Kalman filter update process.

An example of the Kalman filter update process is described below. FIG. 11 is a flowchart illustrating an example of the Kalman filter update process according to the second embodiment.

The temperature T is calculated from the voltage $V_t$ output from the temperature sensor 114 using the expression (21) (step S240).

The angular velocity sensor offset correction voltage value $b\omega(T)$ is calculated from the temperature T calculated in the step S240 using the expression (20) (step S241).

The acceleration sensor offset correction voltage value $b\omega(T)$ is calculated from the temperature T calculated in the step S240 using the expression (22) (step S242).

Steps S243 to S249 are then performed to complete the update process. The steps S243 to S249 are the same as the steps S141 to S147 shown in FIG. 11.

Kalman Filter Correction Process

The Kalman filter correction process according to the second embodiment is the same as that of the first embodiment.

2-5. Effects

The second embodiment achieves the following effect in addition to the effects achieved by the first embodiment.

According to the second embodiment, since the temperature correction term is added to the update expression (20) that calculates the parameter $b\hat{\omega}_k$ and the update expression (21) that calculates the parameter $b\hat{\alpha}_k$, the parameter $b\hat{\omega}_k$ can be corrected based on the temperature correction term using the correction expression (15). A drift due to the sensor offset can be reduced by updating sensor offsets $b\hat{\omega}_k$ and $b\hat{\alpha}_k$ taking account of a change in sensor offset due to temperature, so that the Kalman gain can be further reduced. Therefore, the position coordinates and the posture angle in the virtual three-dimensional space more promptly follow the sensor output.

3. Application Example

The posture information calculation system 1A (1B) according to the above embodiment may be applied to various systems that utilize a 3D mouse as a pointing device, a head mount display used for virtual reality or the like, a tracker that detects the posture of a head, a 3D game pad, or the like. FIG.

12 shows an example of a game system to which the posture information calculation system according to the above embodiment is applied.

A game system 1000 shown in FIG. 12 includes a controller 500, a game machine main body 600, and a display device 700. The controller 500 and the game machine main body 600 are connected via a communication cable 610 so that information can be exchanged therebetween, and the game machine main body 600 and the display device 700 are connected via a communication cable 620 so that information can be exchanged therebetween.

The game system 1000 is configured so that the player operates a fighter aircraft object (3D model) disposed in a three-dimensional space using the controller 500, and the fighter aircraft object is two-dimensionally displayed on a display section 710 of the display device 700 as a fighter aircraft 720 based on a game calculation process performed by the game machine main body 600.

The game system 1000 is configured so that the posture of the fighter aircraft 720 is synchronized with the posture of the controller. For example, when the player has moved the game controller 500 in the rightward/leftward direction (direction A in FIG. 12) in a horizontal plane, the fighter aircraft 720 moves in the rightward/leftward direction (direction a in FIG. 12) along with the movement of the game controller 500. When the player has moved the game controller 500 in the forward/backward direction (direction B in FIG. 12) in a horizontal plane, the fighter aircraft 720 moves in the upward/downward direction (direction b in FIG. 12) along with the movement of the game controller 500. When the player has rotated the game controller 500 (direction C in FIG. 12) in a horizontal plane, the fighter aircraft 720 rotates (direction c in FIG. 12) along with the rotation of the game controller 500.

In order to implement the above operation, the game controller 500 includes three angular velocity sensors that are disposed so that the detection axes thereof intersect perpendicularly, and three acceleration sensors that are disposed so that the detection axes thereof intersect perpendicularly. The values output from these sensors are transmitted to the game machine main body 600, and the posture angle and the position coordinates of the fighter aircraft object in the virtual three-dimensional space are calculated.

The game system 1000 may be implemented by forming the controller 500 and the display device 700 as the sensor information output device 10A (10B) and the posture information calculation device 20A (20B). Therefore, the posture angle and the moving velocity of the controller 500 correspond to the posture angle and the position coordinates of the fighter aircraft object, and a drift due to the sensor offset is corrected each time the controller 500 is stopped, so that the fighter aircraft 720 is returned to the center (origin) of the display section 710. Moreover, since the Kalman gain can be relatively reduced by linking the moving velocity of the controller 500 to the position coordinates of the fighter aircraft object, it is possible to easily cause the posture of the fighter aircraft object to follow the operation of the user in real time.

The controller 500 includes operation levers 510 and 520, and the player can operate equipment (e.g., missile) of the fighter aircraft object by operating the operation levers 510 and 520, for example. Specifically, the game system 1000 allows the player to change the posture of the fighter aircraft object by changing the posture of the controller 500 while operating equipment of the fighter aircraft object by operating the operation levers 510 and 520. This improves the operability and the game playability.

The invention is not limited to the above embodiments. Various modifications and variations may be made without departing from the scope of the invention.

The above embodiments have been described taking an example in which the gyro sensors 110X, 110Y, and 110Z included in the sensor information output device 10A detect the angular velocities around three axes (X-axis, Y-axis, and Z-axis) that intersect perpendicularly. Note that the scope of the invention is not limited thereto. The gyro sensors 110X, 110Y, and 110Z may detect the angular velocities around arbitrary three axes that are not parallel to one another. In this case, the posture information calculation section 220 may convert the angular velocity vectors around arbitrary three axes that are not parallel to one another into angular velocity vectors in an orthogonal coordinate system by alignment correction, and perform the above process.

Likewise, the above embodiments have been described taking an example in which the acceleration sensors 112X, 112Y, and 112Z included in the sensor information output device 10A detect the accelerations in three axial (X-axis, Y-axis, and Z-axis) directions that intersect perpendicularly. Note that the scope of the invention is not limited thereto. The acceleration sensors 112X, 112Y, and 112Z may detect the accelerations in arbitrary three axial directions that are not parallel to one another. In this case, the posture information calculation section 220 may convert the acceleration vectors in arbitrary three axial directions that are not parallel to one another into acceleration vectors in an orthogonal coordinate system by alignment correction, and perform the above process.

The invention includes various other configurations substantially the same as the configurations described in connection with the above embodiments (e.g., a configuration having the same function, method, and results, or a configuration having the same objective and effects). The invention also includes a configuration in which an unsubstantial section (part) described in connection with the embodiments is replaced with another section (part). The invention also includes a configuration having the same effects as those of the configurations described in connection with the above embodiments, or a configuration capable of achieving the same objective as that of the configurations described in connection with the above embodiments. The invention also includes a configuration in which a known technique is added to the configurations described in connection with the embodiments.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A posture information calculation device that calculates a posture angle and position coordinates in a virtual three-dimensional space based on three-axis angular velocity information detected by three angular velocity sensors, and three-axis acceleration information detected by three acceleration sensors, the three-axis angular velocity information being information about angular velocities around three axes that are not parallel to one another, and the three-axis acceleration information being information about accelerations in three axial directions that are not parallel to one another, the posture information calculation device comprising:

a sensor information acquisition section that acquires the three-axis angular velocity information, and the three-axis acceleration information; and a posture information calculation section that calculates the posture angle and the position coordinates in the virtual three-dimensional space based on the three-axis angular velocity information and the three-axis acceleration information acquired by the sensor information acquisition section, the posture information calculation section calculating a fixed coordinate system velocity vector based on an inertial coordinate system acceleration vector obtained from the three-axis acceleration information, and calculating the position coordinates in the virtual three-dimensional space corresponding to the fixed coordinate system velocity vector, the posture information calculation section including:

a posture information update section that updates a parameter necessary for specifying the posture angle and the position coordinates in the virtual three-dimensional space based on the three-axis angular velocity information and the three-axis acceleration information;

a posture information correction section that corrects the parameter updated by the posture information update section under a constraint condition; and a posture information generation section that calculates the posture angle and the position coordinates in the virtual three-dimensional space based on the parameter corrected by the posture information correction section, the posture information update section including a velocity vector update section that updates the fixed coordinate system velocity vector at a time k based on the inertial coordinate system acceleration vector and the fixed coordinate system velocity vector at a time k−1;

the posture information correction section including a velocity vector correction section that corrects the fixed coordinate system velocity vector at the time k updated by the velocity vector update section under a constraint condition that a norm of the fixed coordinate system velocity vector is zero;

the posture information generation section including a position coordinate generation section that generates the position coordinates in the virtual three-dimensional space corresponding to the fixed coordinate system velocity vector at the time k corrected by the velocity vector correction section; and the sensor information acquisition section and the posture information calculation section being implemented by a processor, the three angular velocity sensors and the three acceleration sensors.

2. The posture information calculation device as defined in claim 1, the velocity vector update section updating the fixed coordinate system velocity vector at the time k by:

converting the inertial coordinate system acceleration vector into a fixed coordinate system acceleration vector by rotating the inertial coordinate system acceleration vector based on a fixed coordinate system posture angle vector at the time k−1;

subtracting a fixed coordinate system gravitational acceleration vector from the fixed coordinate system acceleration vector;

performing a first-order integration process on the subtraction result within a predetermined unit time to calculate a unit time fixed coordinate system velocity vector; and adding the unit time fixed coordinate system velocity vector to the fixed coordinate system velocity vector at the time k−1 corrected by the velocity vector correction section.

3. The posture information calculation device as defined in claim 1, the position coordinate generation section setting the fixed coordinate system velocity vector at the time k corrected by the velocity vector correction section to be the position coordinates at the time k.

4. The posture information calculation device as defined in claim 2, the position coordinate generation section setting the fixed coordinate system velocity vector at the time k corrected by the velocity vector correction section to be the position coordinates at the time k.

5. The posture information calculation device as defined in claim 1, the posture information calculation section calculating a fixed coordinate system posture angle vector based on an inertial coordinate system angular velocity vector obtained from the three-axis angular velocity information, and calculating the posture angle in the virtual three-dimensional space based on the fixed coordinate system posture angle vector;

the posture information update section including a posture angle vector update section that updates the fixed coordinate system posture angle vector at the time k based on the inertial coordinate system angular velocity vector and the fixed coordinate system posture angle vector at the time k−1;

the posture information correction section including a posture angle vector correction section that corrects the fixed coordinate system posture angle vector at the time k updated by the posture angle vector update section under a constraint condition based on the inertial coordinate system acceleration vector; and the posture information generation section including a posture angle generation section that generates the posture angle in the virtual three-dimensional space based on the fixed coordinate system posture angle vector corrected by the posture angle vector correction section.

6. The posture information calculation device as defined in claim 2, the posture information calculation section calculating a fixed coordinate system posture angle vector based on an inertial coordinate system angular velocity vector obtained from the three-axis angular velocity information, and calculating the posture angle in the virtual three-dimensional space based on the fixed coordinate system posture angle vector;

the posture information update section including a posture angle vector update section that updates the fixed coordinate system posture angle vector at the time k based on the inertial coordinate system angular velocity vector and the fixed coordinate system posture angle vector at the time k−1;

the posture information correction section including a posture angle vector correction section that corrects the fixed coordinate system posture angle vector at the time k updated by the posture angle vector update section under a constraint condition based on the inertial coordinate system acceleration vector; and the posture information generation section including a posture angle generation section that generates the posture angle in the virtual three-dimensional space based on the fixed coordinate system posture angle vector corrected by the posture angle vector correction section.

7. The posture information calculation device as defined in claim 3, the posture information calculation section calculating a fixed coordinate system posture angle vector based on an inertial coordinate system angular velocity vector obtained from the three-axis angular velocity information, and calculating the posture angle in the virtual three-dimensional space based on the fixed coordinate system posture angle vector;

the posture information update section including a posture angle vector update section that updates the fixed coordinate system posture angle vector at the time k based on the inertial coordinate system angular velocity vector and the fixed coordinate system posture angle vector at the time k−1;

the posture information correction section including a posture angle vector correction section that corrects the fixed coordinate system posture angle vector at the time k updated by the posture angle vector update section under a constraint condition based on the inertial coordinate system acceleration vector; and the posture information generation section including a posture angle generation section that generates the posture angle in the virtual three-dimensional space based on the fixed coordinate system posture angle vector corrected by the posture angle vector correction section.

8. The posture information calculation device as defined in claim 5, the posture angle vector update section updating the fixed coordinate system posture angle vector at the time k by performing a first-order integration process on the inertial coordinate system angular velocity vector within a predetermined unit time to calculate a unit time rotational angle quaternion, and calculating the fixed coordinate system posture angle vector at the time k−1 corrected by the posture angle vector correction section with the unit time rotational angle quaternion.

9. The posture information calculation device as defined in claim 5, the posture angle generation section setting the fixed coordinate system posture angle vector at the time k corrected by the posture angle vector correction section to be the posture angle at the time k.

10. The posture information calculation device as defined in claim 8, the posture angle generation section setting the fixed coordinate system posture angle vector at the time k corrected by the posture angle vector correction section to be the posture angle at the time k.

11. The posture information calculation device as defined in claim 1, the sensor information acquisition section receiving temperature information detected by a temperature sensor;

the posture information update section including:

an angular velocity offset update section that updates an offset of the three angular velocity sensors at the time k based on the temperature information and the offset of the three angular velocity sensors at the time k−1; and an acceleration offset update section that updates an offset of the three acceleration sensors at the time k based on the temperature information and the offset of the three acceleration sensors at the time k−1; and the posture information correction section including:

an angular velocity offset correction section that corrects the offset of the three angular velocity sensors at the time k updated by the angular velocity offset update section; and an acceleration offset correction section that corrects the offset of the three acceleration sensors at the time k updated by the acceleration offset update section.

12. The posture information calculation device as defined in claim 2, the sensor information acquisition section receiving temperature information detected by a temperature sensor;

the posture information update section including:

an angular velocity offset update section that updates an offset of the three angular velocity sensors at the time k based on the temperature information and the offset of the three angular velocity sensors at the time k−1; and an acceleration offset update section that updates an offset of the three acceleration sensors at the time k based on the temperature information and the offset of the three acceleration sensors at the time k−1; and the posture information correction section including:

an angular velocity offset correction section that corrects the offset of the three angular velocity sensors at the time k updated by the angular velocity offset update section; and an acceleration offset correction section that corrects the offset of the three acceleration sensors at the time k updated by the acceleration offset update section.

13. The posture information calculation device as defined in claim 3, the sensor information acquisition section receiving temperature information detected by a temperature sensor;

the posture information update section including:

an angular velocity offset update section that updates an offset of the three angular velocity sensors at the time k based on the temperature information and the offset of the three angular velocity sensors at the time k−1; and an acceleration offset update section that updates an offset of the three acceleration sensors at the time k based on the temperature information and the offset of the three acceleration sensors at the time k−1; and the posture information correction section including:

an angular velocity offset correction section that corrects the offset of the three angular velocity sensors at the time k updated by the angular velocity offset update section; and an acceleration offset correction section that corrects the offset of the three acceleration sensors at the time k updated by the acceleration offset update section.

14. The posture information calculation device as defined in claim 5, the sensor information acquisition section receiving temperature information detected by a temperature sensor;

the posture information update section including:

an angular velocity offset update section that updates an offset of the three angular velocity sensors at the time k based on the temperature information and the offset of the three angular velocity sensors at the time k−1; and an acceleration offset update section that updates an offset of the three acceleration sensors at the time k based on the temperature information and the offset of the three acceleration sensors at the time k−1; and the posture information correction section including:
an angular velocity offset correction section that corrects the offset of the three angular velocity sensors at the time k updated by the angular velocity offset update section; and
an acceleration offset correction section that corrects the offset of the three acceleration sensors at the time k updated by the acceleration offset update section.

15. The posture information calculation device as defined in claim 8,
the sensor information acquisition section receiving temperature information detected by a temperature sensor;
the posture information update section including:
an angular velocity offset update section that updates an offset of the three angular velocity sensors at the time k based on the temperature information and the offset of the three angular velocity sensors at the time k−1; and
an acceleration offset update section that updates an offset of the three acceleration sensors at the time k based on the temperature information and the offset of the three acceleration sensors at the time k−1; and
the posture information correction section including:
an angular velocity offset correction section that corrects the offset of the three angular velocity sensors at the time k updated by the angular velocity offset update section; and
an acceleration offset correction section that corrects the offset of the three acceleration sensors at the time k updated by the acceleration offset update section.

16. The posture information calculation device as defined in claim 9,
the sensor information acquisition section receiving temperature information detected by a temperature sensor;
the posture information update section including:
an angular velocity offset update section that updates an offset of the three angular velocity sensors at the time k based on the temperature information and the offset of the three angular velocity sensors at the time k−1; and
an acceleration offset update section that updates an offset of the three acceleration sensors at the time k based on the temperature information and the offset of the three acceleration sensors at the time k−1; and
the posture information correction section including:
an angular velocity offset correction section that corrects the offset of the three angular velocity sensors at the time k updated by the angular velocity offset update section; and
an acceleration offset correction section that corrects the offset of the three acceleration sensors at the time k updated by the acceleration offset update section.

17. A posture information calculation system comprising:
three angular velocity sensors that respectively detect three-axis angular velocity information that is information about angular velocities around three axes that are not parallel to one another;
three acceleration sensors that respectively detect three-axis acceleration information that is information about accelerations in three axial directions that are not parallel to one another; and
a posture information calculation device that calculates a posture angle and position coordinates in a virtual three-dimensional space based on the three-axis angular velocity information detected by the three angular velocity sensors, and the three-axis acceleration information detected by the three acceleration sensors, the posture information calculation device comprising:

a sensor information acquisition section that acquires the three-axis angular velocity information, and the three-axis acceleration information; and
a posture information calculation section that calculates the posture angle and the position coordinates in the virtual three-dimensional space based on the three-axis angular velocity information and the three-axis acceleration information acquired by the sensor information acquisition section,
the posture information calculation section calculating a fixed coordinate system velocity vector based on an inertial coordinate system acceleration vector obtained from the three-axis acceleration information, and calculating the position coordinates in the virtual three-dimensional space corresponding to the fixed coordinate system velocity vector,
the posture information calculation section including:
a posture information update section that updates a parameter necessary for specifying the posture angle and the position coordinates in the virtual three-dimensional space based on the three-axis angular velocity information and the three-axis acceleration information;
a posture information correction section that corrects the parameter updated by the posture information update section under a constraint condition; and
a posture information generation section that calculates the posture angle and the position coordinates in the virtual three-dimensional space based on the parameter corrected by the posture information correction section,
the posture information update section including a velocity vector update section that updates the fixed coordinate system velocity vector at a time k based on the inertial coordinate system acceleration vector and the fixed coordinate system velocity vector at a time k−1;
the posture information correction section including a velocity vector correction section that corrects the fixed coordinate system velocity vector at the time k updated by the velocity vector update section under a constraint condition that a norm of the fixed coordinate system velocity vector is zero;
the posture information generation section including a position coordinate generation section that generates the position coordinates in the virtual three-dimensional space corresponding to the fixed coordinate system velocity vector at the time k corrected by the velocity vector correction section; and
the sensor information acquisition section and the posture information calculation section being implemented by a processor the three angular velocity sensors and the three acceleration sensors.

18. A posture information calculation method that is implemented by a posture information calculation device, and calculates a posture angle and position coordinates in a virtual three-dimensional space based on three-axis angular velocity information detected by three angular velocity sensors, and three-axis acceleration information detected by three acceleration sensors, the three-axis angular velocity information being information about angular velocities around three axes that are not parallel to one another, and the three-axis acceleration information being information about accelerations in three axial directions that are not parallel to one another, the posture information calculation method comprising:
a sensor information acquisition step that acquires the three-axis angular velocity information, and the three-axis acceleration information; and a posture information calculation step that calculates the posture angle and the position coordinates in the virtual three-dimensional space based on the three-axis angular velocity information and the three-axis acceleration information acquired by the sensor information acquisition step, the posture information calculation step calculating a fixed coordinate system velocity vector based on an inertial coordinate system acceleration vector obtained from the three-axis acceleration information, and calculating the position coordinates in the virtual three-dimensional space corresponding to the fixed coordinate system velocity vector, the posture information calculation step including:
- a posture information update step that updates a parameter necessary for specifying the posture angle and the position coordinates in the virtual three-dimensional space based on the three-axis angular velocity information and the three-axis acceleration information;
- a posture information correction step that corrects the parameter updated by the posture information update step under a constraint condition; and
- a posture information generation step that calculates the posture angle and the position coordinates in the virtual three-dimensional space based on the parameter corrected by the posture information correction step, the posture information update step including a velocity vector update step that updates the fixed coordinate system velocity vector at a time k based on the inertial coordinate system acceleration vector and the fixed coordinate system velocity vector at a time k−1;

the posture information correction step including a velocity vector correction step that corrects the fixed coordinate system velocity vector at the time k updated by the velocity vector update step under a constraint condition that a norm of the fixed coordinate system velocity vector is zero;

the posture information generation step including a position coordinate generation step that generates the position coordinates in the virtual three-dimensional space corresponding to the fixed coordinate system velocity vector at the time k corrected by the velocity vector correction step; and the sensor information acquisition step and the posture information calculation step being performed by a processor the three angular velocity sensors and the three acceleration sensors.

19. A non-transitory computer-readable information storage medium storing a program that calculates a posture angle and position coordinates in a virtual three-dimensional space based on three-axis angular velocity information detected by three angular sensors, and three-axis acceleration information detected by three acceleration sensors, the three-axis angular velocity information being information about angular velocities around three axes that are not parallel to one another, and the three-axis acceleration information being information about accelerations in three axial directions that are not parallel to one another, the program causing a computer to function as:

a posture information calculation section that calculates the posture angle and the position coordinates in the virtual three-dimensional space based on the three-axis angular velocity information and the three-axis acceleration information, the posture information calculation section calculating a fixed coordinate system velocity vector based on an inertial coordinate system acceleration vector obtained from the three-axis acceleration information, and calculating the position coordinates in the virtual three-dimensional space corresponding to the fixed coordinate system velocity vector, the posture information calculation section including:
- a posture information update section that updates a parameter necessary for specifying the posture angle and the position coordinates in the virtual three-dimensional space based on the three-axis angular velocity information and the three-axis acceleration information;
- a posture information correction section that corrects the parameter updated by the posture information update section under a constraint condition; and
- a posture information generation section that calculates the posture angle and the position coordinates in the virtual three-dimensional space based on the parameter corrected by the posture information correction section, the posture information update section including a velocity vector update section that updates the fixed coordinate system velocity vector at a time k based on the inertial coordinate system acceleration vector and the fixed coordinate system velocity vector at a time k−1;

the posture information correction section including a velocity vector correction section that corrects the fixed coordinate system velocity vector at the time k updated by the velocity vector update section under a constraint condition that a norm of the fixed coordinate system velocity vector is zero;

the posture information generation section including a position coordinate generation section that generates the position coordinates in the virtual three-dimensional space corresponding to the fixed coordinate system velocity vector at the time k corrected by the velocity vector correction section; and the posture information calculation section being implemented by a processor the three angular velocity sensors and the three acceleration sensors.

* * * * *